(12) United States Patent
Vine

(10) Patent No.: US 12,551,224 B2
(45) Date of Patent: Feb. 17, 2026

(54) CLOT REMOVAL DEVICE AND METHOD

(71) Applicant: INRETIO LTD, Kibutz Nir Am (IL)

(72) Inventor: Raviv Vine, Moshav Bizaron (IL)

(73) Assignee: INRETIO LTD, Kibutz Nir Am (IL)

( * ) Notice: Subject to any disclaimer, the term of this patent is extended or adjusted under 35 U.S.C. 154(b) by 720 days.

(21) Appl. No.: 17/729,512

(22) Filed: Apr. 26, 2022

(65) Prior Publication Data

US 2023/0057026 A1 Feb. 23, 2023

(30) Foreign Application Priority Data

Aug. 19, 2021 (IL) .......................................... 285744

(51) Int. Cl.
| | | |
|---|---|---|
| *A61B 17/221* | (2006.01) | |
| *A61B 17/00* | (2006.01) | |
| *A61M 25/00* | (2006.01) | |
| *A61M 25/09* | (2006.01) | |

(52) U.S. Cl.
CPC ......... *A61B 17/221* (2013.01); *A61M 25/008* (2013.01); *A61M 25/09* (2013.01); *A61B 2017/00867* (2013.01); *A61B 2017/2215* (2013.01)

(58) Field of Classification Search
CPC ............ A61B 17/221; A61B 17/32056; A61B 2017/2212; A61B 2017/2215; A61B 2017/00867; B01D 29/085; A61F 2/01; A61F 2/013; A61F 2/014; A61F 2/0105; A61F 2/0108; A61F 2002/018; A61F 2230/008; A61F 2230/0067; A61F 2230/0006

USPC .......................................................... 606/159
See application file for complete search history.

(56) References Cited

U.S. PATENT DOCUMENTS

| | | | |
|---|---|---|---|
| 8,382,771 B2 | 2/2013 | Gellman et al. | |
| 8,444,661 B2 | 5/2013 | Nair et al. | |
| 8,777,976 B2 | 7/2014 | Brady et al. | |
| 8,852,205 B2 | 10/2014 | Brady et al. | |

(Continued)

FOREIGN PATENT DOCUMENTS

WO 2011/119872 A1 9/2011

OTHER PUBLICATIONS

Jamie Bell, New stent retriever introduces novel clot capture mechanism, NeuroNews, pp. 1-3 (2016).

*Primary Examiner* — Kankindi Rwego
(74) *Attorney, Agent, or Firm* — FisherBroyles, LLP; Roger L. Browdy; Ronni S. Jillions

(57) ABSTRACT

Techniques and devices for removal of clot/material from body passages utilize a main carrying wire, a main elongated sleeve element braided from a plurality of wires to form a proximal tubular section having a proximal opening and a funnel-shaped distal section tapering distally onto a distal end portion of the main carrying wire for rigid attachment thereto, a deformable ring element coupled to the proximal opening of the main elongated braided sleeve element and configured for changing the proximal opening from a normally opened state to an at least partially closed state, and a control wire rigidly coupled to the deformable ring element for manipulating the proximal opening of the main elongated braided sleeve element between its normally opened and at least partially closed states for secure removal of the captured target clot from the blood vessel.

27 Claims, 18 Drawing Sheets

(56) References Cited

U.S. PATENT DOCUMENTS

| | | | |
|---|---|---|---|
| 2003/0130684 A1* | 7/2003 | Brady | A61F 2/0108 606/200 |
| 2003/0144689 A1 | 7/2003 | Brady et al. | |
| 2003/0212429 A1 | 11/2003 | Keegan et al. | |
| 2004/0199201 A1 | 10/2004 | Kellett et al. | |
| 2005/0085826 A1 | 4/2005 | Nair et al. | |
| 2005/0131449 A1* | 6/2005 | Salahieh | A61F 2/01 606/200 |
| 2007/0088383 A1 | 4/2007 | Pal et al. | |
| 2007/0249998 A1 | 10/2007 | Nair et al. | |
| 2010/0268265 A1 | 10/2010 | Krolik et al. | |
| 2011/0098740 A1 | 4/2011 | Cano et al. | |
| 2011/0125181 A1* | 5/2011 | Brady | A61B 17/22031 606/200 |
| 2011/0152920 A1 | 6/2011 | Eckhouse et al. | |
| 2011/0202088 A1 | 8/2011 | Eckhouse et al. | |
| 2012/0059356 A1 | 3/2012 | Di Palma et al. | |
| 2013/0184739 A1 | 7/2013 | Brady et al. | |
| 2013/0197567 A1* | 8/2013 | Brady | A61B 17/221 606/200 |
| 2013/0310803 A1* | 11/2013 | Morsi | A61B 17/22032 606/200 |
| 2013/0345739 A1 | 12/2013 | Brady et al. | |
| 2014/0100597 A1 | 4/2014 | Wang et al. | |
| 2014/0121672 A1 | 5/2014 | Folk | |
| 2014/0128905 A1 | 5/2014 | Molaei | |
| 2014/0276922 A1 | 9/2014 | Mclain et al. | |
| 2014/0303667 A1 | 10/2014 | Cox et al. | |
| 2015/0025555 A1 | 1/2015 | Sos | |
| 2015/0250497 A1 | 9/2015 | Marks et al. | |
| 2015/0265299 A1 | 9/2015 | Cooper et al. | |
| 2017/0035445 A1 | 2/2017 | Nguyen et al. | |
| 2017/0112513 A1 | 4/2017 | Marchand et al. | |
| 2017/0119409 A1 | 5/2017 | Ma | |
| 2017/0281909 A1 | 10/2017 | Northrop et al. | |
| 2019/0269424 A1 | 9/2019 | Morsi | |
| 2019/0365397 A1 | 12/2019 | Bar | |
| 2020/0121339 A1 | 4/2020 | Brady et al. | |
| 2021/0128185 A1 | 5/2021 | Nguyen et al. | |
| 2021/0228224 A1* | 7/2021 | Razack | A61B 90/39 |

* cited by examiner

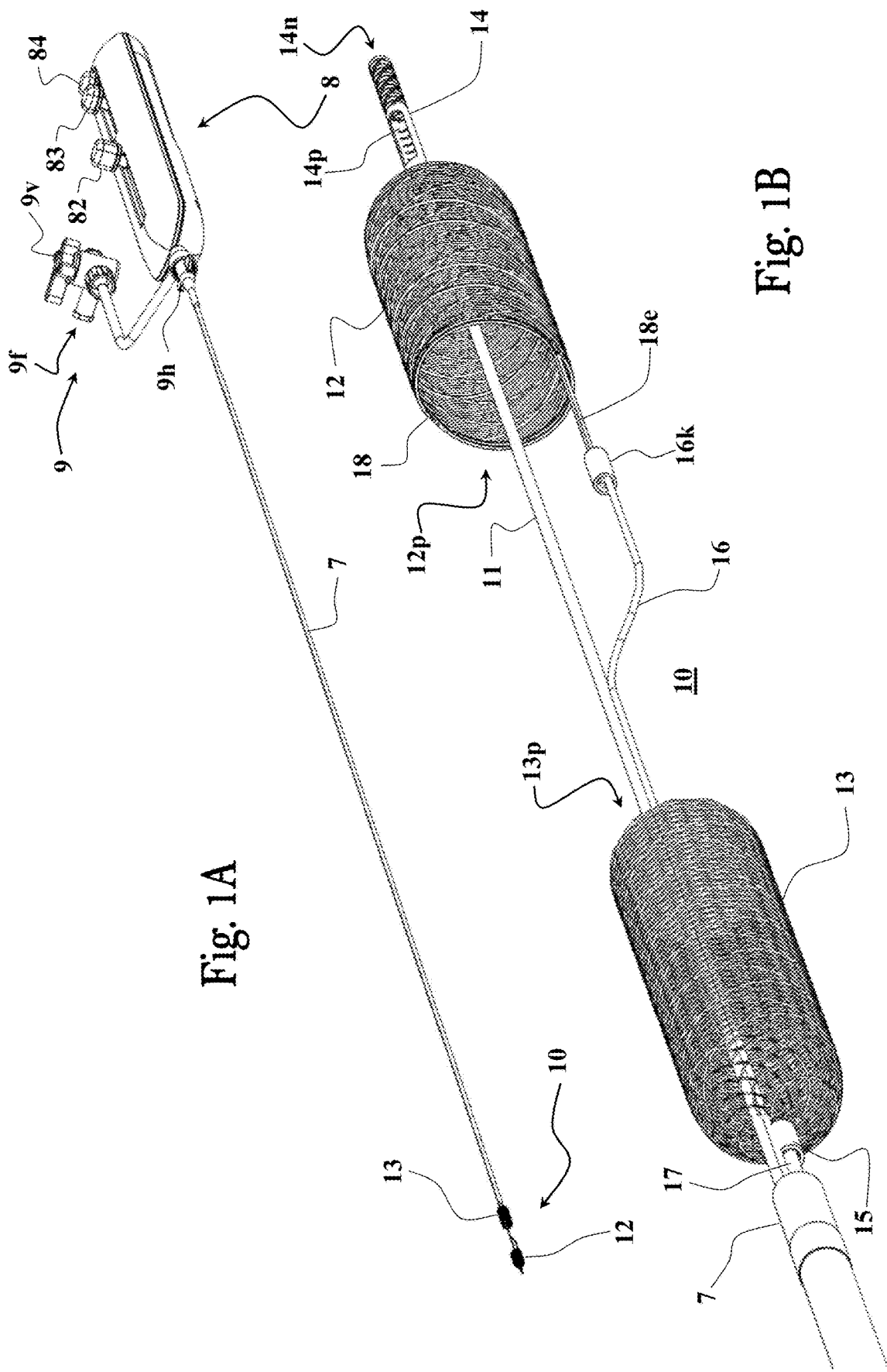

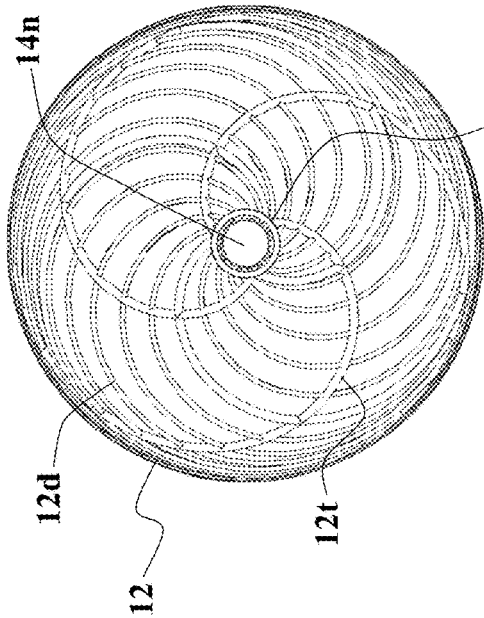
Fig. 2C
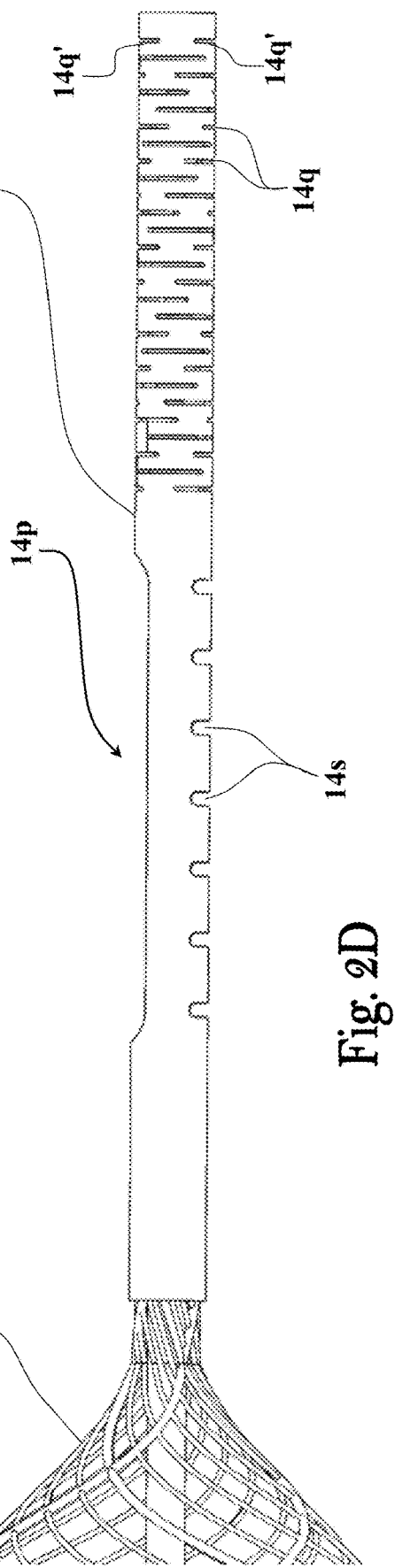
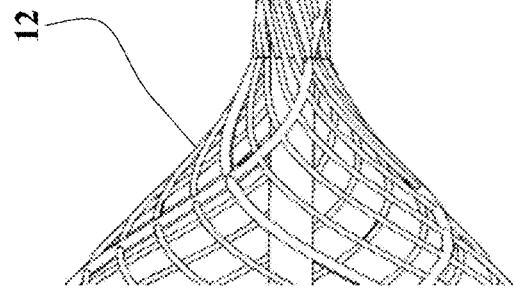
Fig. 2D

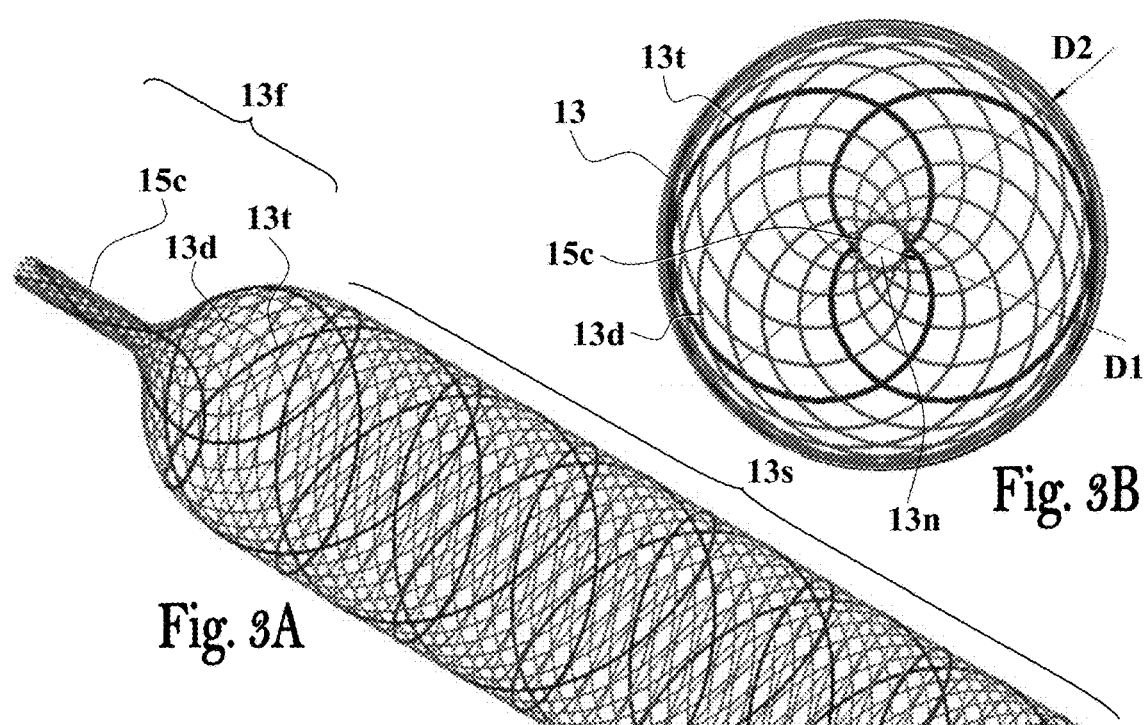
Fig. 3A
Fig. 3B
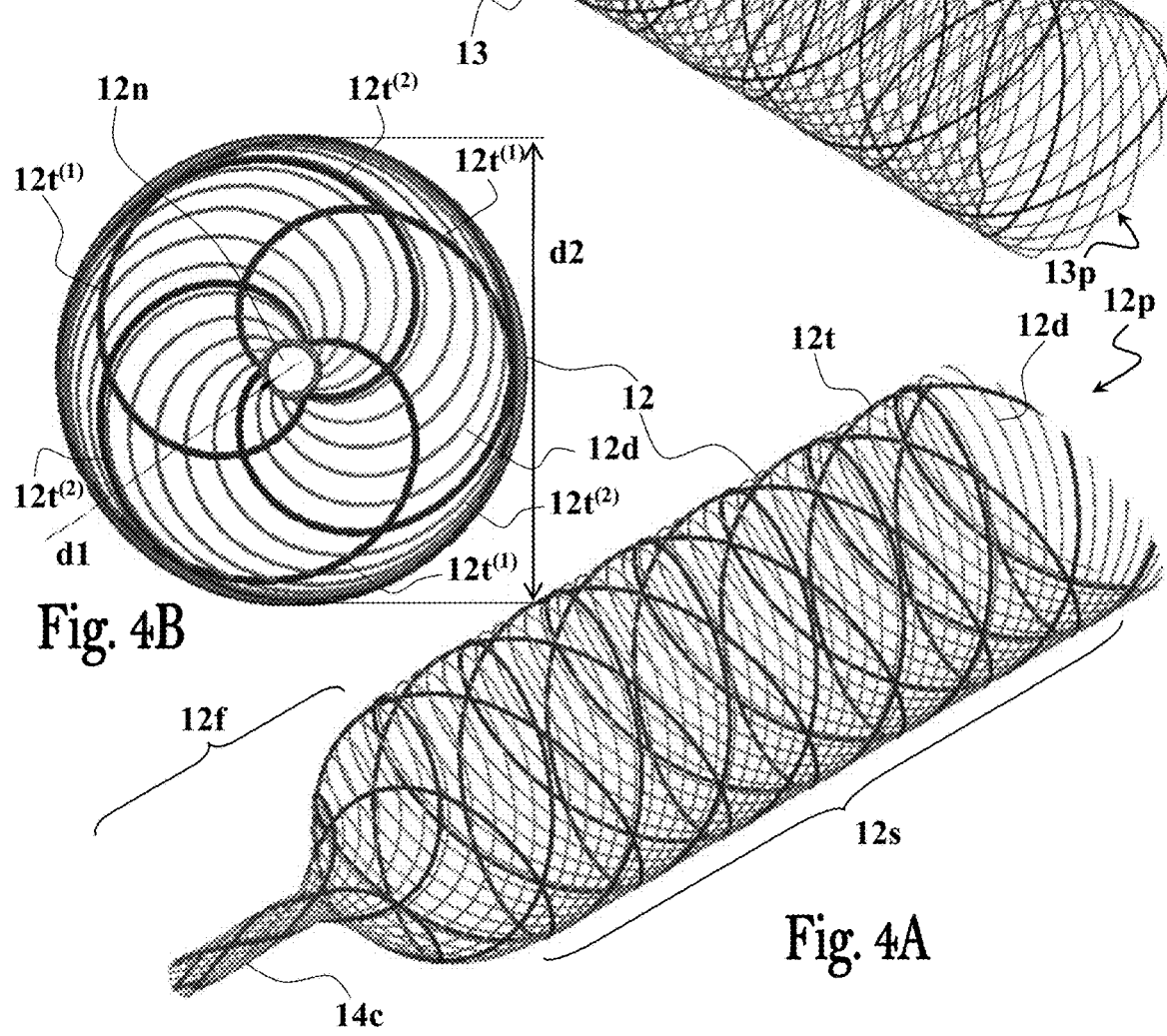
Fig. 4A
Fig. 4B

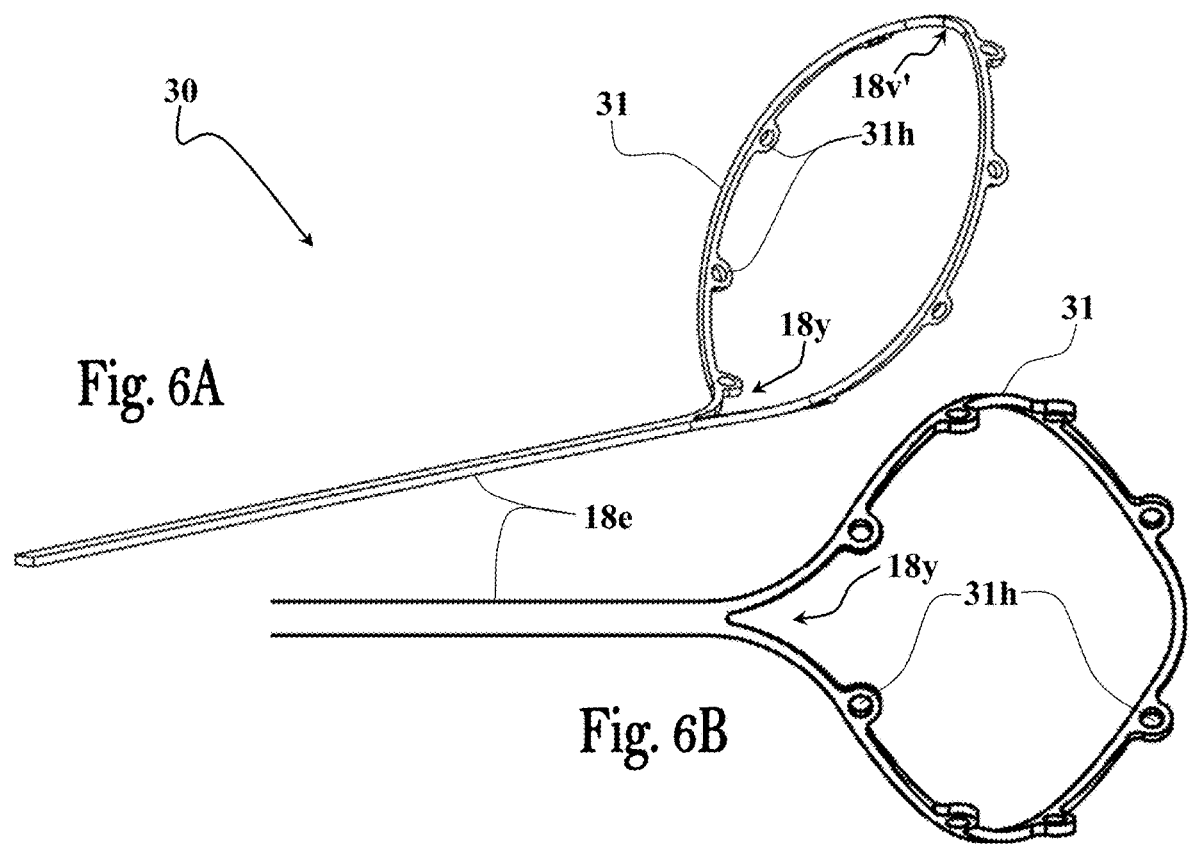
Fig. 6A
Fig. 6B
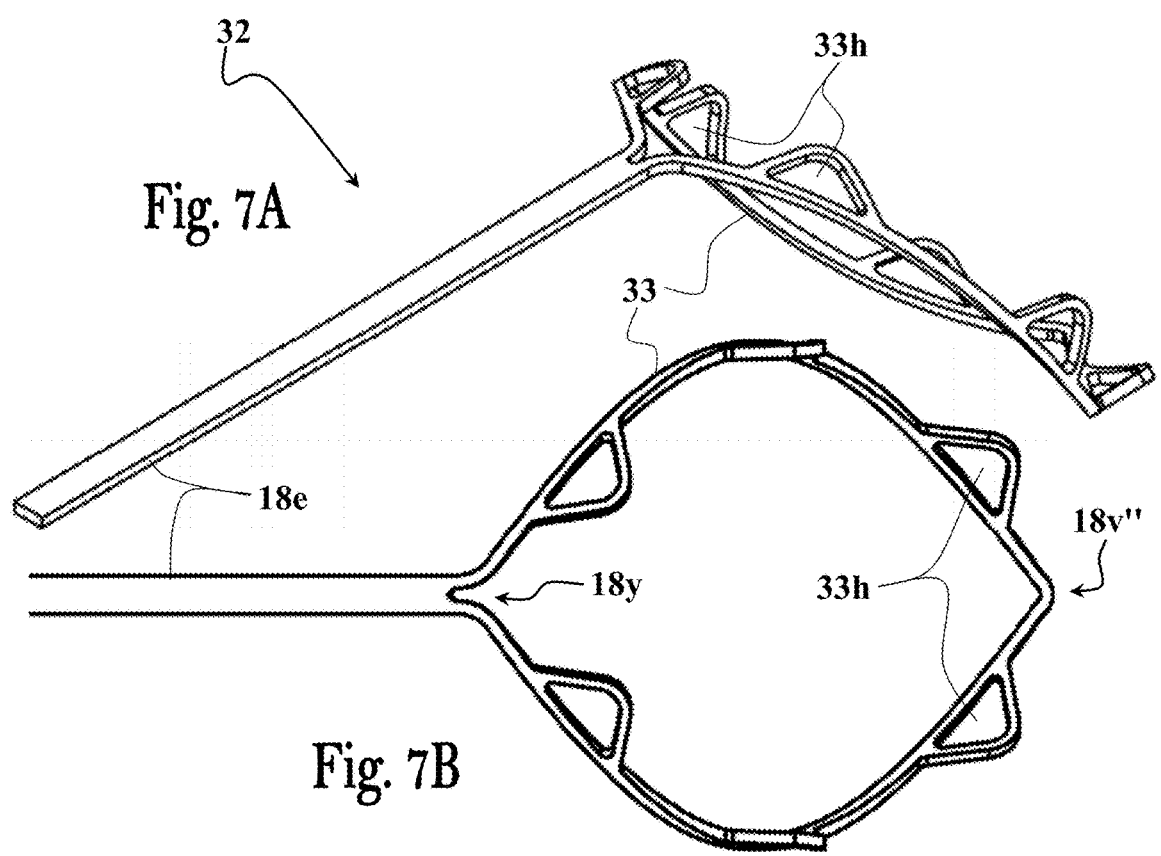
Fig. 7A
Fig. 7B

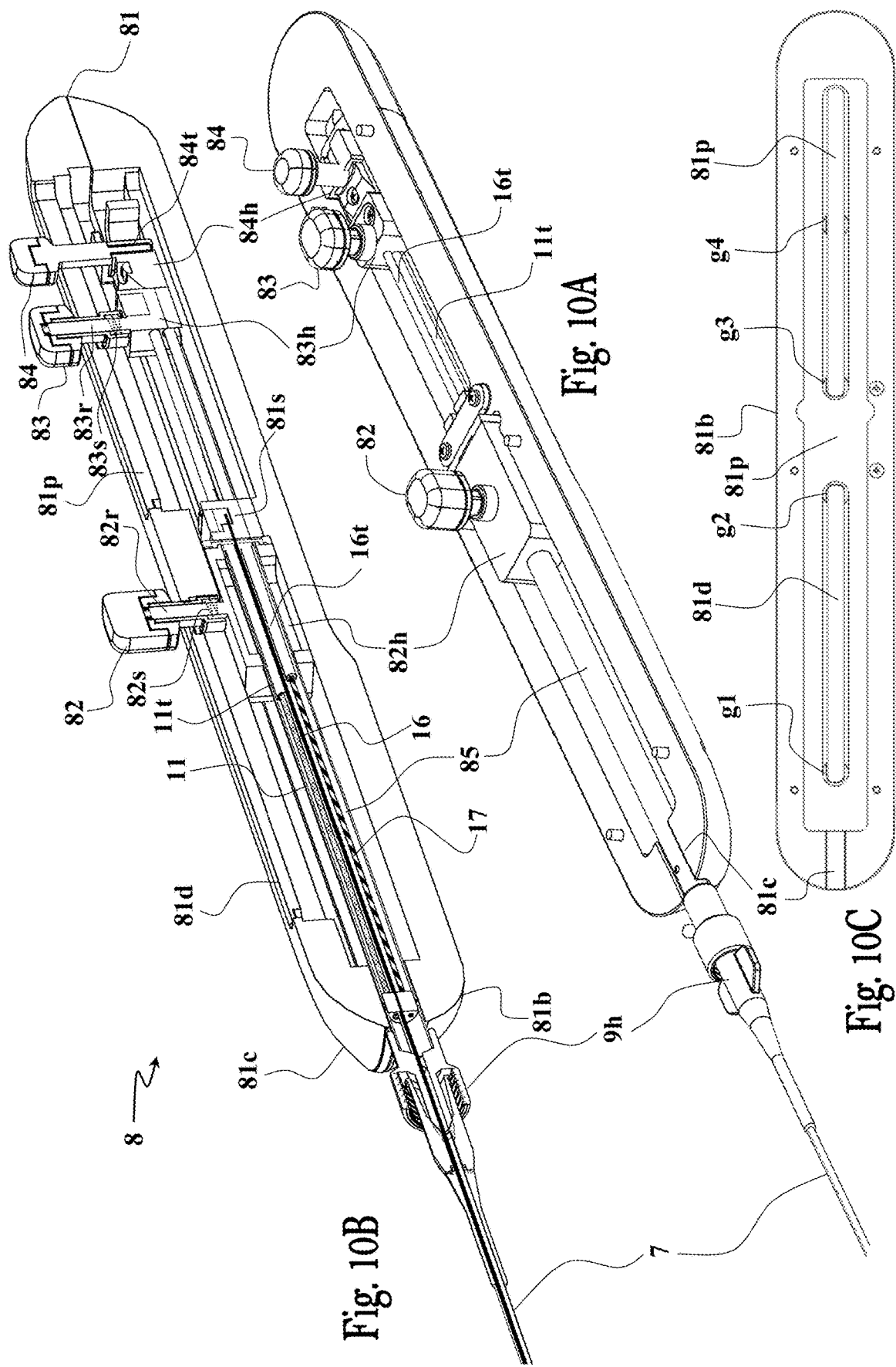

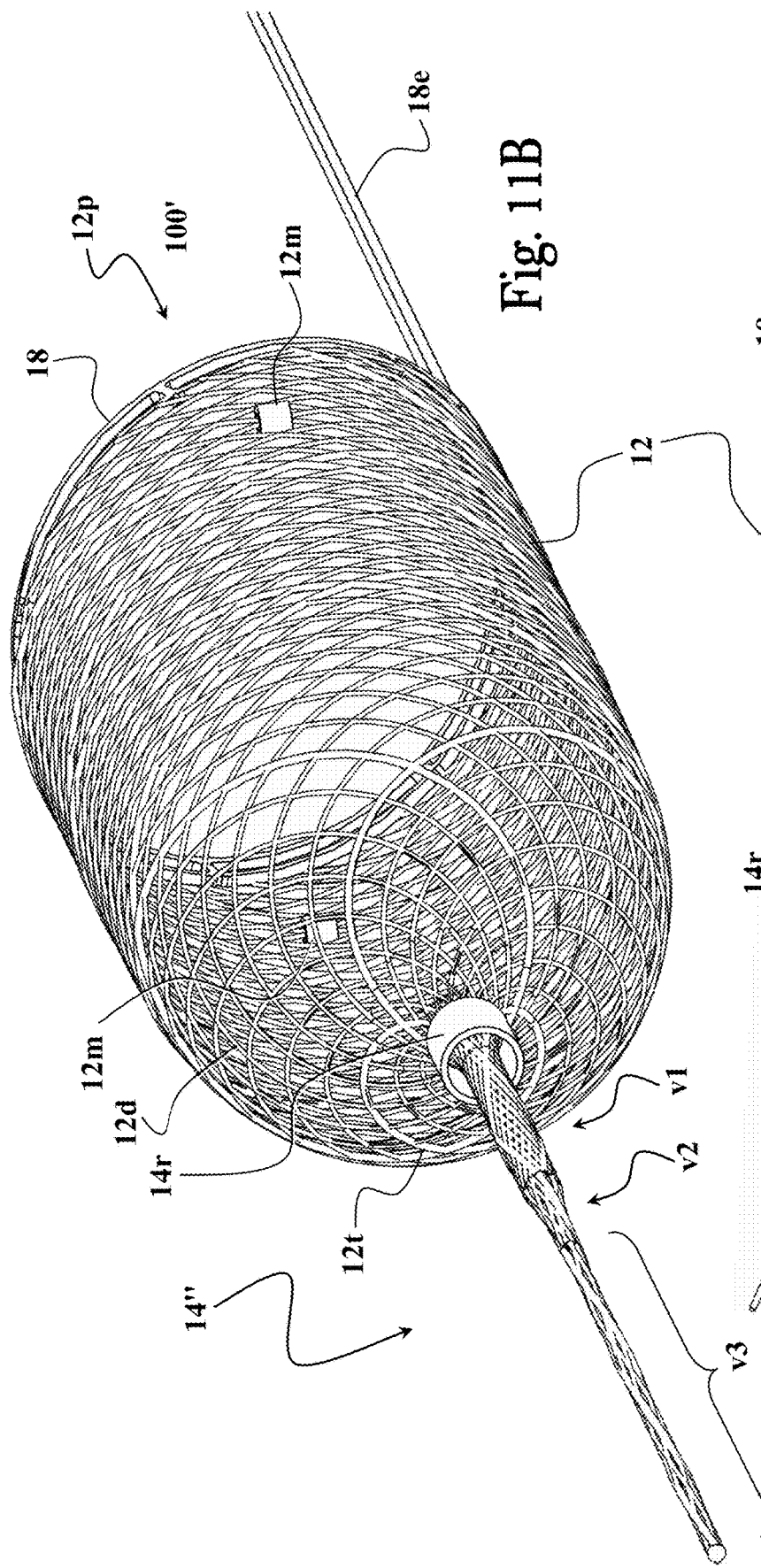
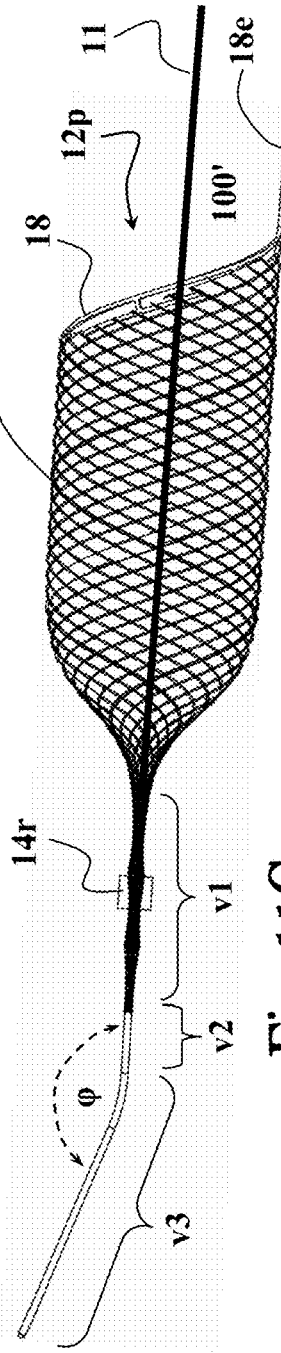
Fig. 11B
Fig. 11C

CLOT REMOVAL DEVICE AND METHOD

TECHNOLOGICAL FIELD

The disclosure generally relates to devices and methods for removal of material from a body lumen, particularly for removal of clots from blood vessels.

BACKGROUND

Strokes are the third leading cause of death in the USA and worldwide, following heart disease and cancer. They kill more than 160,000 people each year in the USA, and the leading cause of adult disability. Ischemic strokes occur when a blood vessel carrying blood to the brain is blocked by a blood clot and/or become narrowed. This causes blood not to reach the brain, or part of the brain. Ischemic strokes account for about 87% of all strokes. Typically, ischemic strokes occur in two ways: (i) cerebral thrombosis (a blood clot or plaque blocks an artery that supplies a vital brain center); and (ii) cerebral embolism (a blood clot breaks off from a thrombus elsewhere in the body, lodges in a blood vessel in the brain and shuts off blood supply to that part of the brain). High blood pressure is one of the leading risk factors of ischemic strokes.

One of the primary procedures for treating strokes is urgent clot removal procedure, however, there are significant challenges associated with designing clot removal devices that can deliver high levels of protection. There are numerous access challenges that make it difficult to appropriately introduce clot removal devices into narrow cerebral blood vessels. In cases where access involves navigating the aortic arch (such as coronary or cerebral blockages), the configuration of the arch in some patients makes it difficult to position a guide catheter.

In addition, the tortuosity challenge is even more severe in the arteries approaching the brain. For example, it is not unusual at the distal end of the internal carotid artery that the device will have to navigate a vessel segment with a 180° bend, a 90° bend, and a 360° bend in quick succession over a few centimeters of vessel. As another example, in procedures for treating pulmonary embolisms, the access may be gained through the venous system and then through the right atrium and ventricle of the heart. The right ventricular outflow tract and pulmonary arteries are delicate vessels that can easily be damaged by inflexible or high-profile devices. For these reasons it is desirable that the emboli/clot retrieval device be of a low profile and capable of flexible access.

The vasculature in the area in which the clot may be lodged is often fragile and delicate. For example, neurovascular vessels are more fragile than similarly sized vessels in other parts of the body and are in a soft tissue bed. Excessive tensile forces applied on these vessels could result in perforations and hemorrhage. Pulmonary vessels are larger than those of the cerebral vasculature, but are also delicate in nature, particularly those vessels that are more distal.

Moreover, a clot may comprise any number of morphologies and consistencies. For example, long strands of softer clot material may tend to lodge at bifurcations or trifurcations, resulting in multiple vessels being simultaneously occluded over significant lengths. More mature and organized clot material is likely to be less compressible than softer fresher clot, and under the action of blood pressure it may distend the compliant vessel in which it is lodged. Furthermore, the inventors hereof realized that the properties of the clot may be significantly changed by the action of the devices interacting therewith. In particular, compression of blood clots may cause dehydration of the clot, which may result in a dramatic increase in both clot stiffness and its friction coefficient.

Clots may not only range in shape and consistency, but also may vary greatly in length, even in any one given area of the anatomy. For example, clots occluding the middle cerebral artery of an ischemic stroke patient may range from just a few millimeters to several centimeters in length.

A particular difficulty encountered when attempting to remove long clots is that conventional devices may be shorter than the clot itself. A device that is shorter than the clot is unlikely to be able to restore flow through the occluded area upon deployment, and thus the pressure gradient across the clot remains a significant impediment to its removal. Since making such a device that can capture the long clot is essential, this would likely render it difficult to track through tortuous anatomies and could be traumatic to the vasculature, taking more force to withdraw and potentially getting stuck, and requiring surgery to remove.

For many reasons, including some or all of the above limitations, it is often necessary for a physician to make multiple passes with a clot retrieval device in order to fully remove an obstructive clot. However, each time a clot retrieval device is withdrawn the access to the target site is lost. Thus, it is necessary to re-advance a guidewire and microcatheter to access and re-cross the clot, and then remove the guidewire and advance the clot retrieval device through the microcatheter. Navigating the guidewire and microcatheter to the clot can take a considerable amount of time, especially if the vessels are tortuous. This additional time and device manipulation all adds to the risks to which the patient is exposed.

The challenges described above need to be overcome for any device to provide a high level of success in removal of clots, restoring flow and facilitating good patient outcomes. Existing devices do not adequately address these challenges. Some clot removal devices known from the patent literature are briefly described hereinbelow.

US Patent Publication No. 2015/0265299 discloses a minimally invasive blood clot capturing device made of nitinol. The nitinol is shaped into a plurality of fingers to form a frame for a basket and funnel to capture and remove blood clots. The basket and funnel being delivered to the blood clot by a catheter. The basket and funnel are capable of being collapsed within a catheter, capable of being deployed into a blood vessel, and capable of being retracted into the catheter for removal from the blood vessel.

US Patent Publication No. 2019/365397 discloses an apparatus, device and method, for executing a clot or plaque removal procedure. In one embodiment, a clot removal device may include a clot holding element for penetrating a target clot and stabilizing the clot in its position; a controllable distal filter that can be extended to cover the target clot; a distal filter, openable downstream from the clot, designed to substantially prevent flow through of clot elements, and further designed to drag the clot out of a vessel, for retrieving by the clot removal device.

US Patent Publication No. 2010/0268265 discloses an apparatus for capturing material within a body lumen. The apparatus includes a shaft carrying an expandable basket device on a distal end thereof. The basket device includes a distal basket carried and a proximal basket carried on the shaft such that the proximal basket is proximal to and spaced apart from the distal basket. Each basket includes an open end communicating with an interior of the respective basket and oriented towards one another. In one embodiment, a tubular middle portion extends between the baskets. In another embodiment, the distal basket includes an actuator coupled to the distal basket open end such that movement of the baskets towards one another causes the actuator to direct the distal basket open end inwardly to allow the open end to be received within the proximal basket to facilitate removal of the apparatus after capturing material within the baskets.

GENERAL DESCRIPTION

There is a need in the art for emboli/clot removal devices, and techniques, for quickly introducing and deploying emboli/clot capturing structures inside narrow body lumens of a treated subject, effectively thereby capture the emboli/clot, and safe removal from the body of the treated subject with the captured emboli/clot. The devices currently being used for emboli/clot removal are mostly not suitable for placement inside narrow body lumens, such as of cerebral blood vessels, and usually don't provide sufficient control for the deployment, manipulating and maneuvering, the emboli/clot capturing components.

The embodiments disclosed herein provides emboli/clot removal devices/techniques designed for safely and rapidly introducing emboli/clot capturing structures into a very narrow body lumen (e.g., of about 2.5 to 4 millimeters in diameter), effectively maneuvering and manipulating the emboli/clot capturing structures to capture and secure material occluding the body lumen, and for safe removal from the body of the treated subject. For this purpose, embodiments disclosed herein utilize one or more elongated sleeve elements braided from very thin wires (e.g., of about 30 to 60 micrometer in diameter) that can be compactly crimped for placement inside, and advancement through, thin tubes (e.g., microcatheter tubes having inner diameter of about 0.6 to 0.85 millimeters). The elongated sleeve elements having an opening at one side thereof, and a tapering portion at the opposite side converging to form a closure therein.

In operation, the one or more braided elongated sleeve elements are introduced into an occluded body lumen of the treated subject via one or more thin tubes, and progressively deployed thereinside for capturing and securing occluding material, for removal from the body of the treated subject. Each of the braided elongated sleeve elements is attached by its closed end side to a respective carrying wire configured for separately/independently maneuvering the braided elongated sleeve, and encapsulating the occluding material inside, or in-between, the at least one braided elongated sleeve elements. The opening of at least one of the braided elongated sleeve elements is provided in some embodiments with a manipulation ring element mechanically coupled to a control wire and configured to controllably change the opening of the braided elongated sleeve element between a normally opened state thereof, and an at least partially closed state.

The manipulation ring element is configured in some embodiments to receive and hold end portions of the web wires of the braided elongated sleeve element. In operation, the shape of manipulation ring element is deformed/stretched by pulling its control wire proximally, thereby deforming the shape of the manipulation ring element from its normally opened state into a stretched at least partially closed state, which correspondingly changes the opening of the braided elongated sleeve element from an opened state into an at least partially closed state. For this purpose, the manipulation ring element is equipped in some embodiments with a plurality of eyelets spaced apart about a circumference thereof and configured to receive and hold end portions of the web wire of the braided elongated sleeve element.

The inventor hereof found out through experimentation that improved effectiveness and response in changing the braided elongated sleeve element between its normally opened and at least partially closed states inside the body lumen is achieved by loose connection of the web wires of the braided elongated sleeve element to the manipulation ring element e.g., by loop-over attachment. The loose connection and loosely connected terminology is used herein to denote that the connection of the web wires to the manipulation ring element provides the web wires some freedom to move/slide over the portions of the manipulation ring element to which they are attached.

For this purpose, manipulation ring elements having eyelets of different shapes and greater sizes were experimented with, to permit web wire motion over segments of the eyelets during deformation the manipulation ring element. This way, the end portions of the web wires of the sleeve element are provided with a certain degree of freedom to move over/along portions of the manipulation ring element, thereby causing more effective closure and opening response of the sleeve element inside the body lumen, which improved the time response of these actions to the deformations of the manipulation ring element.

These findings led to the use of double-ring manipulation element structures, wherein two deformable very narrow ring elements are rigidly attached spaced apart one to the other to form one or more arc-shaped passages for holding the web wires of the braided elongated sleeve element, which improved performance considerably. However, in order to prevent undesired sliding motion of substantial amount of the web wires of the braided elongated sleeve element in a certain direction due to deformation of the double-ring manipulation structure, it was realized that segmentation of double-ring structure is required. In the segmented double-ring manipulation structure a plurality of pairs of partially circular very narrow elements are rigidly coupled spaced-apart one to the other to form a respective plurality of arc-shaped passages therebetween through which the web wires of the braided elongated sleeve element are passed and thereby loosely held e.g., by loop-over attachment. Such segmented double-ring manipulation element structures indeed yield superior performance in the speed and effectiveness in changing the opening of the braided elongated sleeve element between its normally opened and at least partially closed states.

Thus, in some embodiments, the manipulation ring element comprises in at least some portions thereof double-ring structures/segments configured to form a plurality of arc-shaped passages/apertures, for receiving and loosely (slidingly) holding therein end portions of a predetermined number of web wires of the braided elongated sleeve element.

The manipulation ring element can further have one or more elastically collapsible structures formed therein to facilitate its deformation in response to traction of its control wire and thereby the manipulation of the opening of the braided elongated sleeve element between its normally opened and at least partially closed states. This way, with the aid of these one or more elastically collapsible structures, the opening of the braided elongated sleeve element can be quickly and easily manipulated by the control wire, while slidingly/loosely holding the end portions of the web wires of the braided elongated sleeve element in the arc-shaped passages/apertures of the double ring segments, to thereby enhance the flexibility of, and control over the opening and the cross sectional shape of at least some portion, of the braided elongated sleeve element.

In some embodiments an elastically deflectable positioning tube is provide in/on a distal tip of at least one of the carrying wires of one of the braided elongated sleeve elements. The elastically deflectable positioning tube is configured to permit over-the-wire movement of the device through body lumens of the treated subject. In possible embodiments the elastically deflectable positioning tube comprises a side opening formed in a portion of its wall and a distal opening, said side and distal openings providing access to the interior of the flexible positioning tube for passage of a guidewire therethrough. In operation, the braided elongated sleeve elements can be compactly crimped into a thin delivery tube such that the elastically deflectable positioning tube outwardly protrudes from a distal end opening of the delivery tube for over-the-wire positioning the device inside the occluded body lumen of the treated subject.

Optionally, but in some embodiments preferably, proximal end portions of at least one of the carrying wires, the control wire, and the delivery tube, are mechanically coupled to respective slider control buttons/knobs of a control device specially designed to facilitate proper deployment of the at least one braided elongated sleeve element inside the body lumen with respect to occluding material residing thereinside. The slider control buttons/knobs of the control device are configured to facilitate effective maneuvering/manipulation of the deployed braided elongated sleeve elements inside the body lumen for capturing and securing the occluding material therein, and to guarantee safe removal of the braided elongated sleeve elements with the occluding material captured/secured therein from the body of the treated subject.

One inventive aspect of the subject matter disclosed herein relates to a clot removal device comprising a main carrying wire, a main elongated sleeve element braided from a plurality of wires to form a proximal tubular section having a proximal opening and a funnel-shaped distal section tapering distally onto a distal end portion of the main carrying wire for rigid attachment thereto, the main braided elongated sleeve element is configured for deployment inside a blood vessel downstream to a target clot and for capturing the target clot through the proximal opening by proximal retraction thereof via the main carrying wire, a deformable ring element coupled to the proximal opening of the main elongated braided sleeve element and configured for changing the proximal opening from a normally opened state to an at least partially closed state after the capturing of the target clot inside the main elongated braided sleeve element, the deformable ring element comprises two elastically coupled half-ring segments defining a deformation axis of the deformable ring element and having a plurality of attachment sites for attachment of the plurality of wires to the deformable ring element; and a control wire rigidly coupled to the deformable ring element for manipulating the proximal opening of the main elongated braided sleeve element between its normally opened and at least partially closed states with respect to the deformation axis for secure removal of the captured target clot from said blood vessel.

In some embodiments the plurality of attachment sites of the manipulation ring element comprises one or more eyelets. The one or more eyelets can be configured for loose attachment of the web wires of the main elongated sleeve element to permit sliding motion thereof thereover.

The clot removal device comprises in some embodiments a deformable tip distally extending from the funnel-shaped distal section of the main elongated sleeve element. The deformable tip can be formed by at least a portion of the plurality of wires of the main elongated sleeve element. Optionally, but in some embodiments preferably, the deformable tip is configured to provide variably changing deformation levels along its length by changing the number of wires of the main elongated sleeve element thereinside.

Optionally, but in some embodiments preferably, the deformable ring element has a double-ring structure defining one or more passages therein configured for loose attachment of the web wires of the main elongated sleeve element to permit sliding motion thereof thereover. The deformable ring element comprises in some embodiments a plurality of double-ring segments defining a respective plurality of spaced-apart arch-shaped passages configured for loose attachment of the web wires of the main elongated sleeve element to permit sliding motion thereof.

The deformable ring element can also comprise a plurality of elastically collapsible elements configured to facilitate deformation of the shape of the manipulation ring element by the control wire. The deformable ring element comprises in some embodiments a "Y"-shaped portion having an elongated leg configured for coupling to the control wire, and two deformable arms extending distally from a distal end of said elongated leg and in sideway directions with respect to a longitudinal axis of the elongated leg, each one of the two deformable arms elastically connects between the distal end of the elongated leg and a traction-end of a respective one of the two half-ring segments. The deformable ring element can further comprise a "V"-shaped portion having two deformable arms elastically connected one to the other at a distal apex of said "V"-shaped portion and extending proximally and in sideway directions with respect to the deformation axis, the two deformable arms elastically connecting between drag-ends of the two half-ring segments.

The plurality of wires of the main braided elongated sleeve element may comprise a plurality of support wires, configured to geometrically define the proximal tubular portion and the funnel-shaped distal section of the main braided elongated sleeve element, and a plurality of mesh wires interwoven with the plurality support wires. Advantageously, a cross-section of the mesh wires is smaller than a cross-section of said support wires. The plurality support wires can respectively spirally and helically extend in one rotational direction in the funnel-shaped distal section and in the proximal tubular section of the main braided elongated sleeve element, and the plurality of mesh wires are respectively spirally and helically interwoven with the plurality support wires in a counter rotational direction. The clot removal can have a first group of the support wires spirally and helically extending in the one rotational direction in the funnel-shaped distal section and in the proximal tubular section of the braided elongated sleeve element, and a second group of the support wires spirally and helically extending in the counter rotational direction in the funnel-shaped distal section and in the proximal tubular section, the plurality of mesh wires can respectively spirally and helically interwoven in the counter rotational direction with support wires of the first and second groups.

The clot removal device comprises in some embodiments a secondary carrying wire, and a secondary elongated sleeve element braided from a plurality of wires to form a distal tubular section having a distal opening and a funnel-shaped proximal section tapering proximally onto a distal end portion of the secondary carrying wire for rigid attachment thereto. The secondary braided elongated sleeve element can be configured for deployment inside the blood vessel upstream to the target clot and for encapsulating the target clot between the main braided elongated sleeve element and the secondary braided elongated sleeve element. The plurality of wires of the secondary elongated sleeve element can comprise a plurality of support wires configured to geometrically define the proximal tubular and funnel-shaped distal sections of the secondary braided elongated sleeve element, and a plurality of mesh wires interwoven with the plurality support wires, where a cross-section of the mesh wires is smaller than a cross-section of the support wires.

In some embodiments the plurality of support wires respectively spirally and helically extend in one rotational direction in the funnel-shaped distal section and in the proximal tubular section of the secondary braided elongated sleeve element, and the plurality of mesh wires are respectively spirally and helically interwoven with the plurality support wires in a counter rotational direction. The clot removal device can comprise a first group of the support wires spirally and helically extending in the one rotational direction in the funnel-shaped distal section and in the proximal tubular section of the secondary braided elongated sleeve element, a second group of the support wires spirally and helically extending in the counter rotational direction in the funnel-shaped distal section and in the proximal tubular section, the plurality of mesh wires are respectively spirally and helically interwoven in the counter rotational direction with support wires of the first and second groups.

The clot removal device comprises in some embodiments an elastically deflectable tube forming a distal tip of the device and comprising a distal tube opening and a side opening configured for passage of a guidewire therethrough for sliding motion thereover. The elastically deflectable tube can comprise a plurality of arch-shaped pass-through slits spaced-apart along its length for enhancing its elasticity. A first group of the arch-shaped slits can be formed in a wall section of the elastically deflectable tube located opposite to the side opening, and a second group of the arch-shaped slits interlacingly can be formed in a distal portion of the elastically deflectable tube.

Another inventive aspect of the subject matter disclosed herein relates to clot removal system comprising a guidewire configured to be introduced into the blood vessel and pass through the target clot, a delivery tube, and the clot removal device according to embodiments disclosed herein comprised inside the delivery tube readily operable for deployment inside the blood vessel such that the elastically deflectable tube of the clot removal device outwardly protrudes through an opening of the delivery tube for sliding the same over the guidewire for passage through the target clot to capture and remove the target clot captured inside the main braided elongated sleeve element.

Yet another inventive aspect of subject matter disclosed herein relates to clot removal system comprising a guidewire configured to be introduced into the blood vessel and pass through the target clot, a delivery tube configured for passage over the guidewire into the blood vessel and passage through the target clot, and the clot removal device according to embodiments disclosed herein configured for passage through the delivery tube into the blood vessel to capture and remove the target clot inside the main braided elongated sleeve element.

A yet other inventive aspect of subject matter disclosed herein relates to a clot removal system comprising a guidewire configured to be introduced into the blood vessel and pass through the target clot, a delivery tube configured for passage over the guidewire into the blood vessel and passage through the target clot, a housing tube configured to connect to the delivery tube, and the clot removal device according to embodiments disclosed herein comprised inside the housing tube readily operable for deployment inside the blood vessel and configured for passage into and through the delivery catheter and therefrom into the blood vessel to capture and remove the target clot inside the main braided elongated sleeve element.

Any one pf these clot removal systems can comprise a control device having one or more control knobs configured to facilitate deployment of the clot removal device inside the blood vessel and capturing of the target clot inside its braided elongated sleeve element. The control device can be configured to define locked and sliding states of the one or more control knobs in accordance with predefined steps of a clot removal procedure. The control device can have a control knob coupled to the delivery tube and having locked and sliding states corresponding to stages of deployment of at least one of the elongated sleeve elements. Alternatively, or additionally, the control device can have a control knob coupled to the main carrying wire and having locked and sliding states corresponding to stages of capturing and securing the target clot inside the main elongated sleeve element. Alternatively, or additionally, the control device can have a control knob coupled to the control wire configured to facilitate manipulation of the manipulation ring element for securing the captured clot inside the main elongated sleeve element.

A yet other inventive aspect of the subject matter disclosed herein relates to a method for removing a clot from a blood vessel. The method comprises in some embodiments delivering a crimped braided sleeve element into a blood vessel and deploying the same downstream to a target clot, where the braided sleeve element having a normally open proximal opening coupled to a manipulation ring element coupled to a control wire, proximally retracting the braided sleeve element to capture the target clot thereinside via its normally open proximal opening, using the control wire to deform the manipulation ring element and thereby change the normally open proximal opening into an at least partially closed state, thereby securing the captured target clot thereinside, and retrieving the braided elongated sleeve element.

The method can comprise delivering the crimped braided sleeve element into the blood vessel inside a delivery tube. The delivering can comprise introducing a guidewire into the blood vessel, passing the guidewire through the target clot, sliding a distal tip tube structure of the braided elongated sleeve element over the guidewire to position the delivery tube inside the blood vessel, where the distal tip tube structure protruding outwardly from an opening of the delivery tube, and retracting the delivery tube proximally, thereby deploying the braided elongated sleeve element inside the blood vessel.

The method comprises in some embodiments introducing a guidewire into the blood vessel and passing the guidewire through the target clot, passing a delivery tube over the guidewire into the blood vessel and passing the same through the target clot, removing the guidewire from the delivery tube, passing the braided elongated sleeve element into the blood vessel through the delivery tube, and retracting the delivery tube proximally to deploy the braided elongated sleeve element inside the blood vessel for capturing and retrieving the target clot thereinside. Optionally, the method comprising connecting a housing tube to the delivery tube, where the housing tube comprising the braided elongated sleeve readily operable for deployment, and passing the braided elongated sleeve element from the housing tube into the delivery tube for passage therethrough into the blood vessel.

A yet other inventive aspect of the subject matter disclosed herein relates to a clot removal kit comprising one of the following group of components:
- a clot removal device, a guidewire, a delivery tube, and a control device configured to facilitate clot removal procedures utilizing the clot removal device;
- a housing tube having a clot removal device compactly crimped thereinside, a guidewire, a delivery tube, and a control device configured to facilitate clot removal procedures utilizing the clot removal device; or
- a delivery tube having a clot removal device compactly crimped thereinside, a control device configured to facilitate clot removal procedures utilizing the clot removal device.

The terms treatment site, occluded site, clot site and target site are interchangeably used herein to refer to a location (and generally its vicinity) inside a certain body lumen (e.g., artery) wherein occluding material (e.g., clot) is located.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A and 1B schematically illustrate a clot/emboli removal device according to some possible embodiments, wherein FIG. 1A shows a perspective view of the device and FIG. 1B shows a perspective view of a distal portion of the device;

FIGS. 2A to 2D schematically illustrate a distal emboli/clot capturing structure according to some possible embodiments, and a positioning tube thereof, wherein FIGS. 2A and 2B are perspective views at two different orientations of the distal emboli/clot capturing structure, FIG. 2C is a front view thereof, and FIG. 2D is a side view thereof;

FIGS. 3A and 3B respectively show side-perspective and front views of a proximal emboli/clot capturing structure according to some possible embodiments;

FIGS. 4A and 4B are schematic illustrations respectively showing side-perspective and front views of a distal emboli/clot capturing structure according to some possible embodiments;

FIGS. 5A to 5C schematically illustrate a manipulation ring structure according to some possible embodiments, wherein FIG. 5A is a perspective view of the manipulation ring structure, FIG. 5B is a top view thereof, and FIG. 5C is a side view thereof;

FIGS. 6A and 6B schematically illustrate a manipulation ring structure according some other possible embodiments, wherein FIG. 6A is a perspective view of the manipulation ring structure, and FIG. 6B is a top view thereof;

FIGS. 7A and 7B schematically illustrate a manipulation ring structure according further other possible embodiments, wherein FIG. 7A is a perspective view of the manipulation ring structure, and FIG. 7B is a top view thereof;

FIGS. 10A to 10C schematically illustrate a control device according to some possible embodiments, wherein FIG. 10A shows a sectional view of the control device, FIG. 10B shows the control device without is top shell element, and FIG. 10C shows a top view of an under side of the top shell element;

FIGS. 11A to 11C schematically illustrate a clot/emboli removal device according to other possible embodiments having a single sleeve/basket, wherein FIG. 11A shows the clot/emboli removal device having a uniform tip and FIGS. 11B and 11C show the clot/emboli removal device having a deformable tip;

DETAILED DESCRIPTION OF EMBODIMENTS

Figures 2A, 2B:
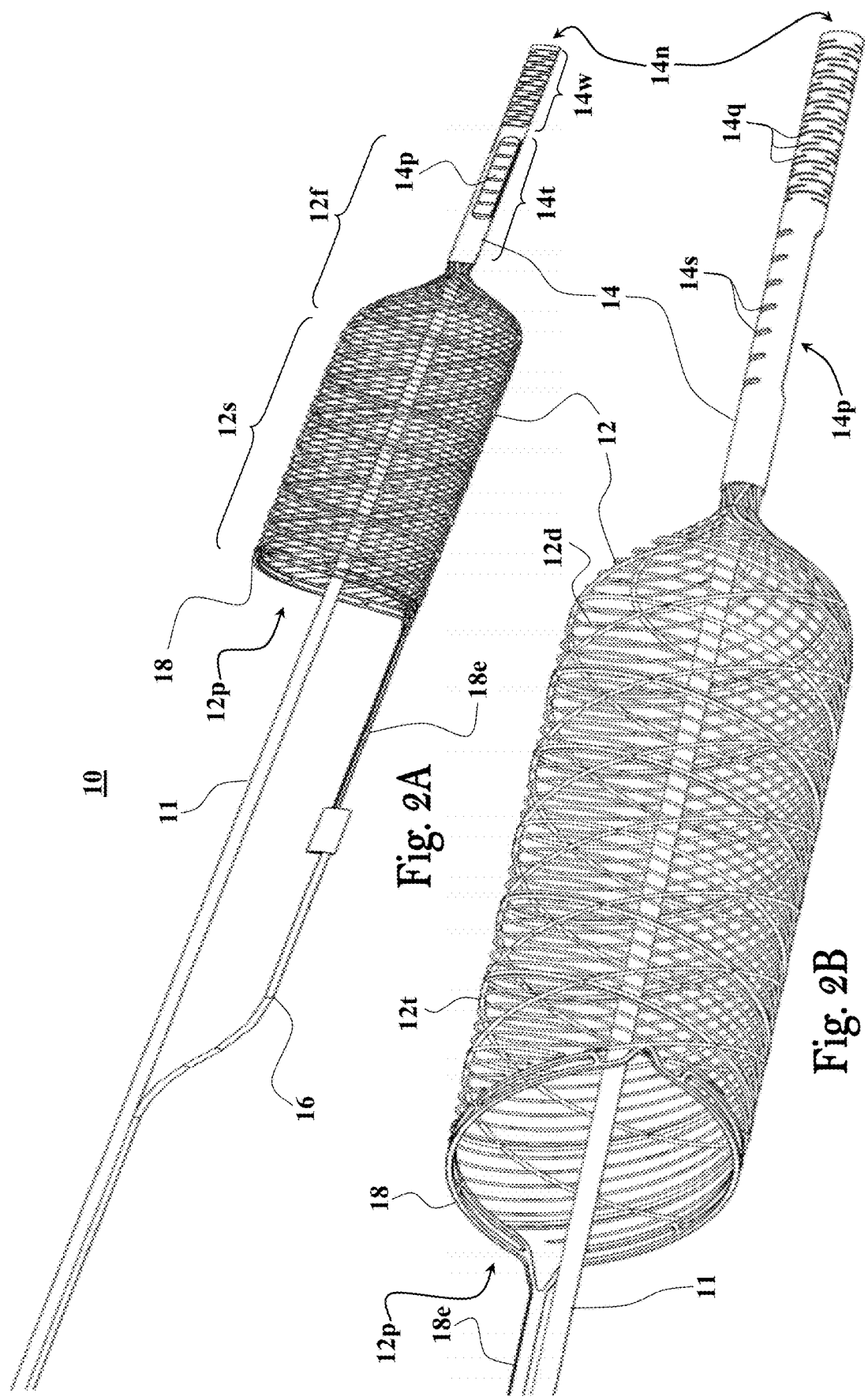

Techniques and tools for removal of material (e.g., clot, emboli, debris, and suchlike) from narrow body lumens (e.g., blood vessels of the brain, the lungs, etc.) are disclosed. Blockage of narrow body lumens can be removed by placing one or more elongated sleeve elements braided from biocompatible/medical-grade (e.g., nitinol) web wires of very small diameters (e.g., of about 30 to 60 micrometer), and fixedly attached by one end thereof to a carrying biocompatible/medical-grade wire to form a sleeve closure thereover. The at least one braided elongated sleeve element is moved and/or manipulated via its carrying wire inside the body lumen to trap and secure via its open-end side the blocking material thereinside for removal from the body of the treated subject.

For this purpose, in some embodiments the open-end side of at least one braided elongated sleeve element is equipped with a manipulation ring element mechanically coupled to a control wire configured to manipulate the shape/state of the open-end side of the braided elongated sleeve element and optionally of at least some portion of the braided elongated sleeve element itself. Particularly, the manipulation ring element and its control wire are configured to permit a user/practitioner to change the open-end side of the braided elongated sleeve element between a normally opened state thereof, in which it is moved for trapping the blocking material, and an at least partially closed state, in which the trapped blocking material is secured inside the braided elongated sleeve element for removal from the body of the treated subject.

The manipulation ring element can be thus fabricated from an elastic biocompatible/medical-grade material, and configured to receive and hold end portions of the web wires of the braided elongated sleeve element in a loose/slidable manner. This way, the practitioner can change the shape of the open-end side of the braided elongated sleeve, and or of at least some portion of the braided elongated sleeve element, by proximally pulling the control wire. For this purpose, in some embodiment the manipulation ring is provided with a plurality of arc-shaped apertures (also referred to herein as double ring portions) configured to loosely/movably secure the web wires of the braided elongated sleeve element thereto.

The manipulation ring element can be configured to include one or more elastically collapsible elements formed therein to facilitate deformation by the control wire of the shape of the manipulation ring and/or of at least some portion of the braided elongated sleeve element attached thereto. The control wire can be mechanically coupled to one of the elastically collapsible elements of the manipulation ring. In some embodiments the manipulation ring comprises two such elastically collapsible elements formed at opposite sides of the manipulation ring to define a deformation axis of the manipulation ring along, or parallel to, a diameter of the ring. The control wire can be mechanically coupled to one of the elastically collapsible elements of the ring to enable substantially symmetrical deformation of the opposite side sections of the manipulation ring away, or towards, the deformation axis of the manipulation ring.

The at least one braided elongated sleeve element can be introduced into the blocked body lumen in a compactly crimped state inside a delivery tube device (e.g., microcatheter). The delivery tube is passed though the blocking material to distally release at least one braided elongated sleeve element for capturing and securing the blocking material thereinside. The released braided elongated sleeve element is deployed inside the body lumen to assume the normally opened state of its opening and elongated sleeve structure. Optionally, but in some embodiments preferably, the web wired walls of the braided sleeve elements are pressed in the deployed state against the inner side walls of the body lumen.

In some embodiments two braided elongated sleeve elements, each fixedly attached to its respective carrying wire to form a closed-end side thereof, are arranged in opposite orientations, such that their open-end sides are facing one another, for delivery into a blocked body lumen. A delivery tube comprising the braided elongated sleeve elements compactly compressed thereinside can be similarly moved across the blocking material to distally release one braided elongated sleeve element at one side of the blockage, and it can be then further moved proximally to release the other braided elongated sleeve element at the other side of the blockage. The released braided elongated sleeves are deployed inside the body lumen to assume the normally opened states of their openings and of their elongated sleeve structures. Optionally, but in some embodiments preferably, the web wired walls of the braided elongated sleeve elements are pressed in the deployed state against the inner side walls of the body lumen.

The deployed braided elongated sleeve elements can be moved one towards the other to capture and encapsulate the blocking material inside their inner tubular volumes. Optionally, but is some embodiments preferably, the distally deployed braided elongated sleeve element is proximally moved inside the body lumen to capture the blocking material and to from a securing capsule as its open-end side abuts/adjoins the open-end side opening of the proximally deployed braided elongated sleeve element.

Optionally, but is some embodiments preferably, the distal braided elongated sleeve element comprises a manipulation ring coupled to a control wire, configured as disclosed herein to manipulate the open-end side of the distal braided elongated sleeve element. In this case, after the deployed distal braided elongated sleeve element is proximally moved to capture the blocking material, the control wire can be pulled proximally to at least partially close/collapse the open-end side of the sleeve and at least some portion of the sleeve structure. The at least partially closed/collapsed braided elongated sleeve element can be further moved proximally and at least partially received inside the inner volume of the proximal braided elongated sleeve element for securing the blockage material captured thereinside and secure removal thereof from the body of the treated subject. In emergency situations, the distal braided elongated sleeve element is quickly removed in its at least partially closed/collapsed state with the blockage material captured thereinside, without interacting with the proximal braided elongated sleeve elements.

The operations caned out with the at least one braided elongated sleeve element inside the body lumen can be accurately controlled by a control device having one or more sliding control knobs. The control device can be configured to define sliding and locked states for the control sliding knobs, for each stage of the procedure. For example, a respective control sliding knob can be coupled to the carrying wire of each braided elongated sleeve element, and configured to assume a first locked state upon deployment inside the body lumen, a sliding state during the capturing of the blockage material, and a second locked state for securing the braided elongated sleeve element with the blockage material captured thereinside and removal from the body of the treated subject. Similarly, a control sliding knob can be coupled to the control wire coupled to the manipulation ring element of the distal braided elongated sleeve element and configured to assume a first locked state upon deployment inside the body lumen, a sliding state during the capturing of the blockage material for at least partially closing/collapsing the sleeve element, and a second locked state for securing the braided elongated sleeve element with the blockage material captured thereinside in the at least partially closed/collapsed state of the sleeve element, and removal from the body of the treated subject.

The various embodiments of the present application are described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical. Emphasis instead being placed upon clearly illustrating the principles of the invention to allow persons skilled in the art to make and use it, once they understand its principles.

For an overview of several example features, process stages, and principles of the invention, the examples of emboli/clot removal tools/techniques illustrated schematically and diagrammatically in the figures are intended for occluded blood vessels. These emboli/clot removal tools/techniques are shown as one example implementation that demonstrates a number of features, processes, and principles used for removal of blockage material from a body lumen of a subject, but they are also useful for other applications and can be made in different variations for other body lumen types. Therefore, this description will proceed with reference to the shown examples, but with the understanding that the invention recited in the claims below can also be implemented in myriad other ways and embodiments without departing from the essential characteristics described herein, once the principles are understood from the descriptions, explanations, and drawings herein. All such variations, as well as any other modifications apparent to one of ordinary skill in the art and useful in clot/emboli removal applications may be suitably employed, and are intended to fall within the scope of this disclosure.

Reference is made to FIGS. 1A and 1B illustrating a perspective view of a material (e.g., clot) removal device 10 in its operative/deployed state (also referred to herein as a normally deployed state) according to some possible embodiments. As shown in FIG. 1A, the material removal device 10 includes two functionally different elongated basket/sleeve elements (generally referred to herein as sleeve elements), i.e., a main (distal) sleeve element 12 and a secondary (proximal) sleeve element 13. It is noted that the term "proximal" is used herein to denote the direction closer to the operator (practitioner), and the term "distal" is used herein to denote the direction closer to the treatment site where the clot is located.

As seen in FIG. 1B, each component of the material removal device 10 is coupled to a separate/independent working wire. In particular, the main and secondary sleeve elements 12 and 13 are respectively connected to a main carrying wire 11 and a secondary carrying wire 17. The main and secondary carrying wires, 11 and 17 respectively, are configured for manipulating/displacing the main sleeve element 12 and the secondary sleeve element 13, respectively, reciprocally inside a body lumen. More specifically, the main carrying wire 11 is configured for moving forward and backwards the main sleeve element 12 inside the body lumen, i.e., towards and away from the secondary sleeve element 13. The main carrying wire 11 is movable forward and backwards and configured for manipulating/displacing the secondary sleeve element 13 inside the body lumen.

In this non-limiting example, the sleeve elements 12,13 are elongated mesh sleeves braided from a type of elastic/shape-memory biocompatible/medical-grade (e.g., Nitinol) wire having a very narrow diameter (e.g., 30 to 60 micrometer). As shown in FIG. 4A, in some possible embodiments, the main sleeve element 12 is formed as an elongated mesh sleeve braided from a first plurality of web wires as to form a proximal section 12s, and a tapering distal section 12f. The proximal section 12s is of a generally tubular geometry and has a proximal opening 12p, and the tapering section 17f is generally of a funnel-shaped geometry tapering distally onto a distal end portion of the main carrying wire 11 to rigidly converge and attach/couple to the main control wire 11 e.g., by a crimp sleeve/tube.

As shown in FIG. 3A, in some possible embodiments, the secondary sleeve element 13 is formed as an elongated mesh sleeve braided from a second plurality of web wires as to form a distal section 13s, and a tapering proximal section 13f. The distal section 13s is of a generally tubular geometry and has a distal opening 13p, and the tapering section 13f has a funnel-shaped geometry tapering proximally onto a distal end portion of the secondary carrying wire 11 to rigidly converge and attach/couple to the secondary carrying wire 11 e.g., by the crimp sleeve/tube 15 shown in FIG. 1B.

In some possible embodiments, the first plurality of web wires forming the main sleeve element 12 includes a number of web wires which is different from (e.g., greater than) a number of web wires of the second plurality of mesh wires forming the secondary sleeve element 13. In some possible embodiments, the first and second arrangements of the mesh wires can include two or more types of mesh wires differing in their physical properties as will be described hereinbelow in details.

Referring back to FIGS. 1A and 1B, the distal and proximal sleeve elements 12,13 are configured to be delivered in a compactly crimped state inside a delivery tube 7, such as a micro-catheter, into a body lumen (e.g., blood vessel 40 in FIGS. 8, 12 and 15) comprising occluding/blocking material (e.g., clot 41 in FIGS. 8, 12 and 15). The sleeve elements 12,13 are released inside the body lumen to restore their normally opened/deployed state thereinside, for capturing occluding/blockage material deposited inside the body lumen and removal thereof from the body of the treated subject. Particularly, the distal sleeve element 12 is deployed distal to the occluding/blocking material to prevent distal migration of the occluding/blocking material during the procedure and to capture the material inside the sleeve interior volume, and the proximal sleeve element is deployed proximal to the occluding/blocking material to prevent proximal migration of the occluding/blocking material and for securing removal of the material captured inside the distal sleeve element 12.

The main sleeve element 12 is configured for capturing/collecting via its proximal opening 12p material (e.g., emboli/clot) occluding/blocking the body lumen, by deployment thereof inside the body lumen to form a trapping pocket and proximally retracting it for entrapping/retaining the occluding/blocking material therewithin. The secondary sleeve element 13 can be configured for encapsulating the occluding/blocking material between the main and the secondary elongated sleeve elements 12 and 13 i.e., within their internal volumes.

In some possible embodiments the secondary sleeve element 13 is configured for receiving therewithin at least a portion of the main sleeve element 12 (carrying the clot). More specifically, upon engagement of the main and secondary sleeve elements 12 and 13 a capsule/closed cavity for the captured clot/material is formed, such that the captures clot/material is secured/trapped within the capsule/closed cavity. Namely, the clot/material is trapped within a space formed by the interior volumes of the main and secondary sleeve elements 12 and 13 when at least a portion of the main sleeve element 12 is inserted within the secondary sleeve element 13, as will be described further below in details with reference to FIGS. 8A to 8H.

For example, in clot removal procedures, the main sleeve element 12 is configured to be deployed/released inside a blood vessel (40 in FIGS. 8, 12 and 15) downstream to a target clot/material (clot 41 in FIGS. 8, 12 and 15), and the secondary sleeve element 13 is configured to be deployed/released upstream to the target clot/material, such that the main and secondary sleeve elements 12 and 13 are located on opposite sides of the clot/material inside the blood vessel. As shown FIG. 1B, the main and the secondary elongated sleeve elements 12 and 13, in their normally deployed state, face each other by their proximal and distal openings, 12p and 13p respectively. The terms "downstream" and "upstream" are used herein to denote locations insides the blood vessel with respect to the clot/material and the direction of the blood flow inside the blood vessel.

As further seen in FIG. 1A, the material removal device 10 can be associated with a transport/delivery system which includes a delivery tube/micro-catheter 7 configured for carrying the material/clot removal device 10 to the target site in its compactly crimped state, and a control device 8 configured to facilitate controlled movement and manipulation of components of the material removal device 10 during the material/clot removal procedures. In operation, the control device 8 is operatively coupled to the delivery tube/micro-catheter 7 and to the main carrying wire 11 the main sleeve elements 12 and the control wire 16 of the manipulation ring element 18. The control device 8 is configured for controlling the release of the material removal device 10 from the delivery tube/micro-catheter 7, and movement/manipulation of the elongated sleeve elements 12,13 of the material removal device 10 during clot/material removal procedures. Operation of the material removal device 10 by the control system 8 is carried out by manipulating its sliding control knobs 82, 83 and 84, to separately/independently move/manipulate the delivery tube 7, the main carrying wire 11, and the control wire 16.

The material removal device 10, in its initial undeployed/inoperable state, is crimped/folded within the delivery tube/micro-catheter 7. In operation, the delivery tube/micro-catheter 7, carrying the material removal device 10 in its undeployed/inoperable state, is inserted into the blood circulation system of the treated subject and advanced to a desired position in a vicinity of the clot/material (i.e., in the treatment site). Once the delivery tube/micro-catheter 7 is disposed at the desired location in the treatment site in the vicinity of/adjacent to the target clot/material, the material removal device 10 is deployed therefrom such that one or more components/elements of the material removal device 10 are released from the delivery tube/micro-catheter 7 in a pre-defined sequence/successive stages and deployed outside the delivery tube/micro-catheter 7, as will be described with further details hereinbelow with reference to FIGS. 8A to 8H.

As also seen in FIG. 1B, the main sleeve element 12 is equipped with a manipulation element 18 having a ring-shaped geometry mounted to a cross-section of the distal sleeve element 12, namely on/to its proximal opening 12p. Optionally, but in some embodiments preferably, the manipulation ring element 18 is loosely coupled to the distal sleeve element 12 via its web wires along a circumference thereof, as can be better seen in FIG. 2B. The manipulation element 18 is configured for changing/deforming the opening 12p of the proximal sleeve element 12 between its normally opened/deployed state and an at least partially closed state after the capturing of said target clot/material inside the main sleeve element 12.

As shown in FIG. 1B, the manipulation element 18 can be controlled by a leg member 18e proximally projecting from a location on its circumference, by which it is mechanically coupled to the control wire 16. The leg member 18e can be connected to the control wire 16 by a crimp sleeve/tube 16k, which provides a rigid coupling between the leg member 18e and the control wire 16. The control wire 16 is configured for forward or backwards movement in the body lumen, i.e., towards and away from the main sleeve element 12, and it is configured for manipulating the proximal opening 12p of the main sleeve element 12, and at least some portion of the main sleeve element 12, between its normally opened state and an at least partially closed/collapsed state.

Once the leg member 18e is proximally attracted (by the control wire 16) it causes deformation (stretching) of the manipulation ring element 18 to shift from its initial substantially round shape into a substantially oval at least partially closed shape. Consequently, at least some portion of the distal sleeve element 12 is correspondingly deformed, such that at least a portion thereof in the vicinity of the proximal opening 12p receives a slightly convex and substantially closed shape, such it can be received/inserted within the proximal sleeve element 13 to form an enclosure in which the captured clot/material can be encapsulated by the proximal and distal sleeve elements 12 and 13 for secure retrieval.

In some embodiments, the material removal device 10 comprises an elastically deflectable positioning tube 14, configured for over-the-wire positioning of the material removal device 10. The elastically deflectable tube 14 is rigidly coupled to a distal end of the main carrying wire 11. The positioning tube 14 includes a longitudinal lateral opening/window/aperture 14p and a distal opening 14n through which the guidewire (42 in FIGS. 8A-C and 12A-B) is inserted/passed for sliding motion of the material removal device 10 thereover. In some embodiments at least a portion of the positioning tube 14 is substantially elastic for facilitating movement of the device through tortuous body lumens in a safe and atraumatic fashion.

In some embodiments, the material removal device 10 comprises an infusion port 9 fluidly coupled to the delivery tube/micro-catheter 7 via a hub 9h, and configured for introducing antithrombotic substance(s) and/or a medicament through the delivery tube/micro-catheter 7 into the target site. The infusion port 9 can have a valve 9v configured for controlling flow rate of the antithrombotic agent/substance and/or other material(s) conveyed to target site through the delivery tube/micro-catheter 7, and a feeding port 9f by which it is coupled to a fluid source/reservoir (not shown) e.g., of the antithrombotic/medicament substance(s).

FIGS. 2A to 2D respectively show a configuration of the distal sleeve element 12 and the positioning tube 14, according to some possible embodiments. As best seen in FIG. 2B, the manipulation element 18 can be configured to form a slanted ring structure coupled to the web wires of the distal sleeve element 12. FIG. 2C shows a front view of the distal sleeve element 12, and FIG. 2D is an enlarged view of the elastically deflectable positioning tube 14 according to some possible embodiments.

As shown in FIGS. 2 to 4, in some embodiments, the main and secondary sleeve elements 12,13 are formed from a plurality of interlaced/interwoven mesh wires, so as to form net/grid-like structures of the sleeve elements. Optionally, the net/grid-like structures of the main and secondary sleeve elements 12,13 are formed by a plurality of intersecting web wires.

The plurality of web wires of the sleeve elements include in some embodiments two different types of web wires, differing in their physical properties. Such physical properties can include, inter alia length, width, thickness, cross-sectional diameter . . . etc. In the examples shown in FIGS. 2B, 2C, 4A and 4B, the first plurality of web wires of the main sleeve 12 includes support wires 12t configured to form a core structure of the main sleeve element 12, and mesh wires 12d interwoven therewith. In particular, the support wires 12t geometrically define the proximal tubular section 12s and the funnel-shaped distal section 12f, of the main sleeve element 12. The mesh wires 12d are interwoven with the support wires 12t as to constitute the complete mesh structure of the main sleeve element 12. As better seen in FIGS. 2B and 2C, in some embodiments the plurality of support wires 12t spirally extend proximally in one rotational direction to form the funnel-shaped distal section 12f, and thereafter helically extend proximally in same rotational direction to form the proximal tubular section 12s of the main sleeve element 12. The mesh wires 12d in the funnel-shaped distal section 12f and the proximal tubular section 12s are respectively spirally and helically interwoven with the support wires 12t in a second rotational direction counter to the first rotational direction of the support wires 12t.

The support wires 12t have relatively large cross-sectional diameter with respect to the mesh wires 12d, which have relatively small cross-sectional diameter. In some possible embodiments, the first plurality of web wires includes six (6) support wires 12t and twenty-six (26) mesh wires 12d, summing to a total of thirty-two (32) web wires composing/constituting the body of the main sleeve element 12. The cross-sectional diameter of the support wires 12t can be in the range of 45 to 75 micrometers, optionally about 60 micrometers, and the cross-sectional diameter of the mesh wires 12d can be in the range of 20 to 40 micrometers, optionally about 30 micrometers.

As seen in FIGS. 4A and 4B, in some embodiments the plurality of support wires 12t comprises a first group of the support wires $12t^{(r)}$ spirally and helically extending in one rotational direction in the funnel-shaped distal section 12f and in the proximal tubular section 12s of the main sleeve element 12, and a second group of the support wires 120) that spirally and helically extend in a second (counter) rotational direction in the funnel-shaped distal section 12f and in the proximal tubular section 12s. As best seen in FIG. 4B, the plurality of mesh wires 12d are spirally and helically interwoven in the counter rotational direction with support wires 12t of said first and second groups.

Optionally, and in some embodiments preferably, at least some of the support wires 12t,13t and/or the mesh wires 12d,13d have radiopaque properties, so as to attain enhanced visualization thereof with respect to the clot/material and/or to distinguish it from other objects in the treatment site. Thus, according to one exemplary embodiment radiopacity may be provided by the metallic material from which the web wires are made, and may include a material which provides radiopacity, for example, a noble metal, such as gold, tantalum, platinum, etc.

In some embodiments, the support wires 12t are made from, or comprise, radiopaque materials for radiography (e.g., X-rays, gamma rays) visibility i.e., so that the mesh wires 12d of the mesh wires 12d are substantially not visualized. This way, the braided elongated sleeve element 12 can be visualized by standard radiography equipment, without requiring addition of radiopaque markers to the device. Similarly, in possible embodiments, the support wires 13t of the proximal sleeve element 13 are made from, or comprise, radiopaque materials for providing visualization thereof by standard radiography equipment.

Likewise, the metallic material of the web wires can be alloyed with one or more of the following metals: Pd, W, Nb, Co, and Cu. According to another exemplary embodiment, the wires can be made of a core tube (cannular strand) containing an axially disposed radiopaque wire, for example, a radiopaque core clad with a different outer material. Examples of radiopaque materials include, inter alia, Pt, Au, Pd, W, Nb, Co, Ta, Ag, and Cu. Examples of cladding materials include stainless steel, Nitinol, and polymers such as Capron and Nylon without limitation. According to yet another example, the web wires can have radiopaque parts/sections of a predetermined length.

In some possible embodiments, radiopacity can yet be achieved by using radiopaque markers (not shown), such as bears or ferrules, which can be attached to or placed around the web wires forming the distal sleeve element 12. In this manner, materials, which have higher radiopacity than the distal sleeve element 12 structure itself, such as gold, tantalum or platinum, can be utilized as markers and be strategically placed along the web wires of the distal sleeve element 12 to increase the visualization of the distal sleeve element 12.

It should be understood that the retention ability/property of the main sleeve element 12 and the secondary sleeve element (13 in FIGS. 1A-B and 3A-3B) depends on the size of the mesh cells/apertures/holes that depend on density of the mesh (defined by number of crossover points per centimeter or per inch). The size of the mesh cells (apertures) is can generally be about 90 to 210 micrometers) and depends on the diameter of the web wires. Thus, the relatively high number of web wires and the relatively decreases sized of the mesh cells/apertures of the distal sleeve element 12 imparts an enhanced retention characteristics to the distal sleeve element 12 inside the body lumen, when the clot/material is entrapped therewithin.

As shown in FIG. 2B, the manipulation element 18 having the ring-shaped geometry is coupled to the distal sleeve element 12 via its web wires along the circumference of the manipulation ring element 18, thereby coupling between the manipulation ring element 18 and the distal sleeve element 12. In some embodiments, the web wires are passed through elongated circumferential pass-through slits (also referred to herein as double-ring segments) 22a-22f (seen in FIG. 5B) of the manipulation element 18, to form loop-like knots along the circumference of the manipulation ring element 18 e.g., by looping thereover. Hence, attraction of the operating leg member 18e by the control wire 16 along its axis in a direction away from the distal sleeve element 12 causes deformation/stretching of the manipulation ring element 18 to shift its normally opened substantially round shape (resting state) into an oval at least partially closed shape. The opening 12p of the distal sleeve element 12, and at least some portion of the distal sleeve element 12 consequently collapse into a corresponding a substantially/at least partially closed/collapsed states.

Referring now to FIG. 2D, showing a side view of the distal tip of the material removal device 10 and of its positioning tube 14 used in some embodiments for over-the-wire positioned the material removal device 10 inside the blocked/clotted body lumen. The positioning tube 14 is rigidly coupled to the distal end of the main carrying wire 11, and optionally also to the distal sleeve element 12. As also seen in FIGS. 2A and 2B, the positioning tube 14 has few integrated structures that includes a proximal portion 14t and a distal portion 14w, which are both configured to exhibit enhanced elasticity to improve the maneuverability of the tip across tortuous body lumens is a safe and atraumatic manner. This configuration provides that positioning tube 14 can be moved through various vessels of the blood system without causing substantial damage thereto.

The proximal portion 14t of the positioning tube 14 is configured in some embodiments for mounting on a distal tip portion (14c in FIG. 4A) of the distal sleeve element 12, while providing rigid coupling therebetween (e.g., by crimping a proximal end portion of the positioning tube 14 thereover). In some embodiments, the proximal portion 14t can also be rigidly coupled to the distal tip of the carrying wire 11 e.g., over the distal tip portion (14c) of the distal sleeve element 12 e.g., by crimping a proximal end portion of the positioning tube 14 over the distal tip (14c) of the distal sleeve element 12 and a distal tip of the carrying wire 11 passing therethrough to provide rigid attachment therebetween.

As seen in FIGS. 2A-2B and 2D, the proximal portion 14t of the positioning tube 14 has a lateral opening 14p through which a guidewire (42) can be passed, and a plurality of spaced apart elasticity enhancement apertures/slits 14s, arranged opposite to the lateral opening 14p for improved bendability. The distal portion 14w of the positioning tube 14 distally extends from its proximal portion 14t and has a distal end opening 14n through which the guidewire (42) is passed, and a plurality of semi-circular/arched-shaped pass-through elasticity enhancement slits 14q. The semi-circular pass-through slits 14q are circumferentially arranged along the distal portion 14w in a pre-defined pattern. In some embodiments the distal portion 14w comprises a plurality of pairs 14q' of the semi-circular pass-through slits 14q formed in opposing sides of the positioning tube 14 along its length, such that each consecutive pair 14q' the semi-circular pass-through slits 14q is rotated by a defined angle with respect of a previous/preceding pair 14q' of the semi-circular pass-through slits 14q, to thereby significantly enhance the elasticity/bendability to the distal portion 14w.

Reference is made FIGS. 3A and 3B schematically illustrating, respectively, a perspective view and a front view of the proximal sleeve element 13 according to some possible embodiments. As seen in FIG. 3A, the proximal sleeve element 13 has a body of generally tubular geometry and a proximal tip portion 15c by which the proximal sleeve element 13 is rigidly coupled to the proximal tip of its carrying wire (17 in FIG. 1B). In some embodiments, the proximal sleeve element 13 is generally an elongated mesh sleeve structure made of two types of interlaced/interwoven web wires. In possible embodiments, the mesh sleeve structure of the proximal sleeve element 13 includes two types of intersecting web wires. The two types of web wires differ in their cross-sectional diameter/width. In particular, the proximal sleeve element 13 includes in some embodiments a plurality of support wires 13t, each having a relatively large cross-sectional diameter which form a core structure of the proximal sleeve element 13, and a plurality of mesh wires 13d, each of a relatively small cross-sectional diameter (with respect to the cross-sectional diameter of the support wires 13t) interlaced/interwoven with the support wires 13t.

The cross-sectional diameter of the support wires 13t can be in the range of 50 to 70 micrometers, optionally about 60 micrometers, and the cross-sectional diameter of the mesh wires 13d can be in the range of 35 to 45 micrometers, optionally about 40 micrometers. In some possible embodiments the proximal sleeve element 13 is formed from a total of twenty-four (24) web wires including four (4) support wires 13t and twenty (20) mesh wires 13d. In some possible embodiments, the proximal sleeve element 13 and the distal sleeve element (12 in FIG. 2B) can have similar structures, namely, they can be formed by an identical number of web wires.

With reference to FIG. 3B, the cross-sectional diameter D1 of the proximal tip 15c of the proximal sleeve element 13 can generally by in the range of 0.3 to 0.4 millimeters, optionally about 0.35 millimeters. The cross-sectional diameter D2 of the elongated tubular body section (13f in FIG. 3A) can generally by in the range of 3 to 5 millimeters, optionally about 4 millimeters. As also seen in FIG. 3B, the proximal tip 15c of the proximal sleeve element 13 defines a proximal opening 13n thereof, through which the distal end portion of the carrying wire 17 is passed for rigid attachment of the proximal sleeve element 13 thereto.

Figure 5A:
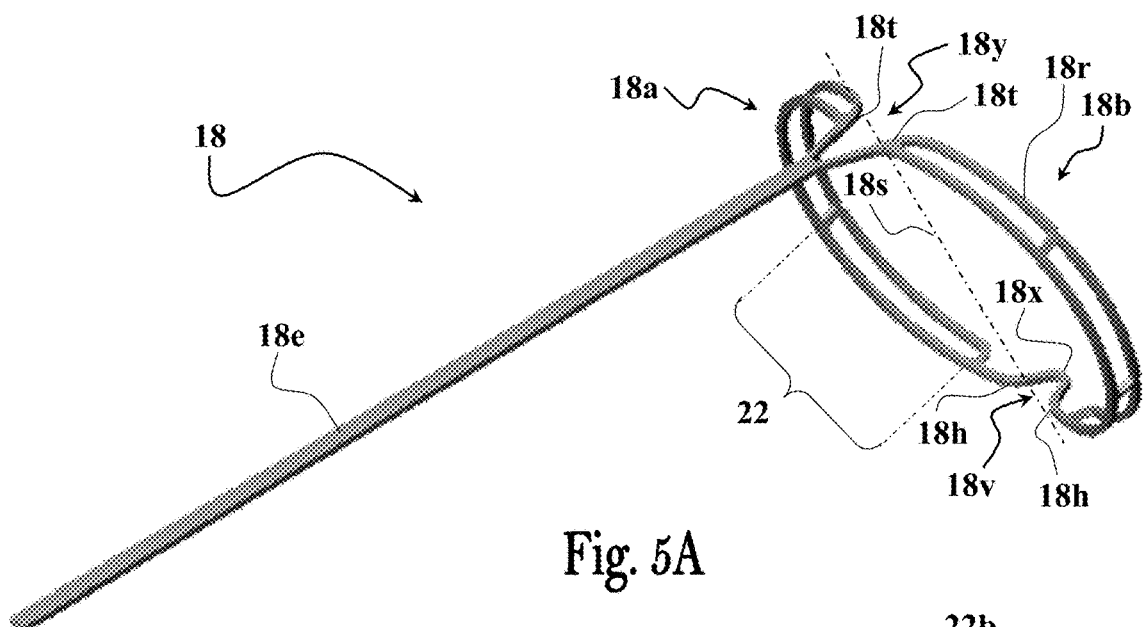
Figure 5B:
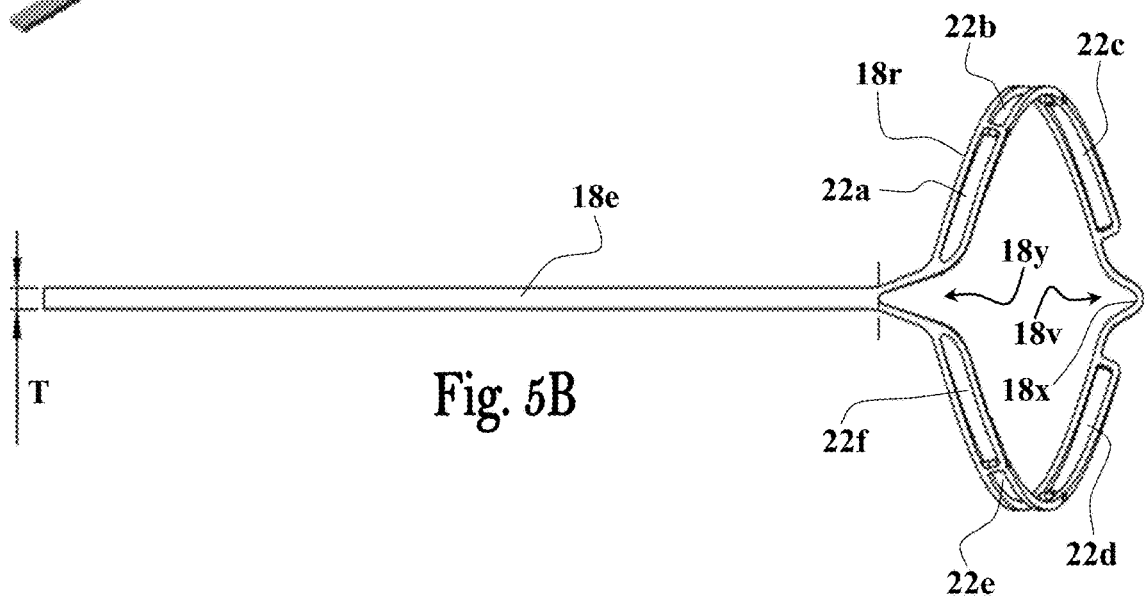
Figure 5C:
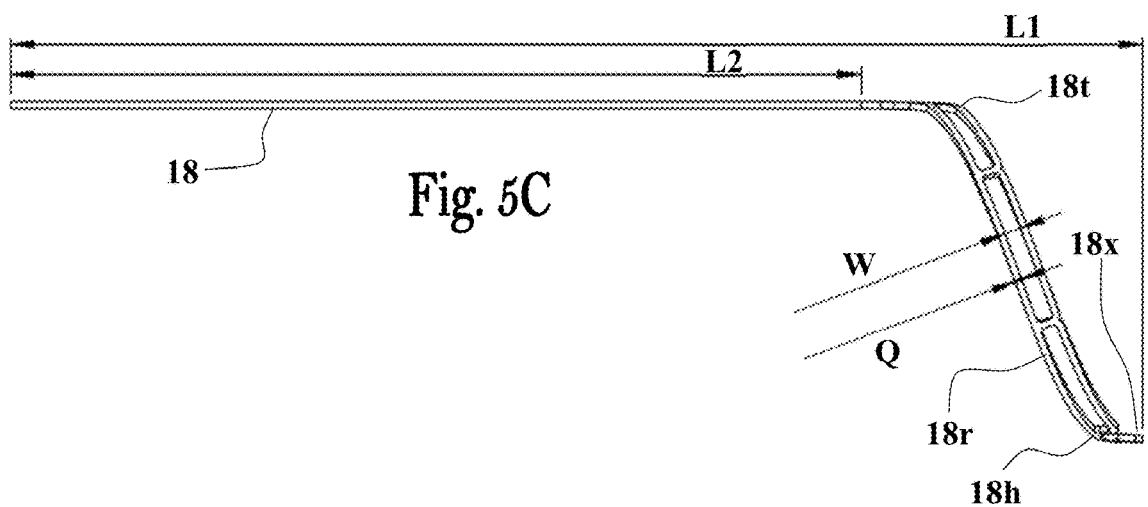

Reference is now made to FIGS. 5A to 5C, schematically illustrating the manipulation ring element 18 according to some possible embodiments. The manipulation ring element 18 has a ring-shaped structure 18r including a plurality of double-ring segments forming elongated pass-through arc-shaped passages 22a-22f arranged on the circumference of its ring-like shaped structure 18r. The elongated pass-through arc-shaped passages 22a-22f are adapted for loop-over coupling of the web wires of the distal sleeve element (12 in FIG. 2A-B) to the manipulation ring element 18. For example, the web wires of the distal sleeve element (12) can be passed through the elongated pass-through arc-shaped passages 22a-22f to form loop-shaped knots. In some possible embodiments, each double-ring segment forming an elongated pass-through arc-shaped passage 22a-22f has a width W in the range of 0.1 to 0.3 millimeters, optionally about 0.2 millimeters, defined by respective ring-segments having a width Q in the range of 0.06 to 0.1 millimeters, optionally about 0.08 millimeters.

In some embodiments the manipulation ring element 18 has one or more elastically collapsible elements. In this specific and non-limiting example, the manipulation ring element 18 comprises two elastically collapsible elements 18y and 18v located at opposing sides thereof to define a deformation axis 18s of the manipulation ring element 18. In this non-limiting example, the deformation axis 18s symmetrically divides the manipulation element 18 into two half-ring segments 18a and 18b. The leg member 18e of the manipulation ring element 18 can be configured to apply push/pull forces to the ring-shaped structure 18r and thereby change its shape.

Optionally, but in some embodiments preferably, the leg member 18e connects to the ring-shaped structure 18r an intersection point/area between the deformation axis 18s and the ring-shaped structure 18r. This way, the application of traction forces to the leg member 18e (i.e., pulling it proximally) deforms/stretch the ring-shaped structure 18r about the deformation axis 18s, as sections of the two half-ring segments 18a and 18b of the ring-shaped structure 18r are forced to move one towards the other. On the other hand, pushing the leg member 18e distally forces sections of the two half-ring segments 18a and 18b of the ring-shaped structure 18r to move one away from the other, thereby facilitating restoration of the normally-opened state of the ring-shaped structure 18r.

The elastically collapsible element 18y can be formed by a generally "Y"-shaped portion of the manipulation ring element 18, having a leg portion from which the leg member 18e proximally extends, and two arms extending distally and in sideway directions with respect to the longitudinal axis of the leg member 18e, to respectively elastically connect to traction-ends 18t of the half-ring segments 18a and 18b. The other elastically collapsible element 18v can be formed by a generally "V"-shaped portion of the manipulation element 18 having two deformable arms elastically connected one to the other at a distal apex 18x of the elastically collapsible element 18v, wherein said arms extending proximally and in sideway directions with respect to the longitudinal axis of the leg member 18e to elastically connect between drag-ends 18h of the two half-ring segments 18a and 18b.

In some possible embodiments, the leg member 18e has a width T that can be in the range of 0.15 to 0.25 millimeters, optionally about 0.2 millimeters, and a length L2 that can be in the range of 8 to 12 millimeters, optionally about 10 millimeters. The integrated structure of the manipulation element 18, which includes the leg member 18e and the ring-shaped element has a length L1 that can be in the range of 11 to 15 millimeters, optionally about 13.3 millimeters.

Reference is made FIGS. 6A and 6B schematically illustrating a manipulation ring element 30 according to other possible embodiments having a plurality eyelets 31h spaced apart along the circumference of the ring-shaped portion 31 thereof. The manipulation ring element 30 is generally similar to manipulation element 18 shown in FIGS. 5A to 5C, in having leg member 18e for connection to the control wire (16) and the deformable ring-shaped portion with two elastically collapsible elements 18y and 18v'. The main differences between these configurations are in the use of the eyelets 31h to connect the web wires of the distal sleeve element (12) to the manipulation element 30 (instead of arc-shaped pass-through passages 22 form by the double-ring segments), which yields a somewhat overall thinner configuration of the deformable ring-shaped portion 31.

FIGS. 7A and 7B schematically illustrate a manipulation ring element 32 according to yet other possible embodiments having a plurality triangular-shaped eyelets 33h arranged spaced apart along the circumference of the ring-shaped portion 33 thereof. The manipulation ring element 32 is generally similar to manipulation element 30 shown in FIGS. 6A and 6B, in having leg member 18e for connection to the control wire (16) and the deformable ring-shaped portion with two elastically collapsible elements 18y and 18v". The main difference between these configurations is in the use of the triangular-shaped apart eyelets 33h to connect the web wires of the distal sleeve element (12) to the manipulation ring element 32, which provide substantially greater openings and thereby permit looser connection of the web wires, and some level of movability of the web wires which improve performance of the manipulation ring element 32.

Figure 8A:
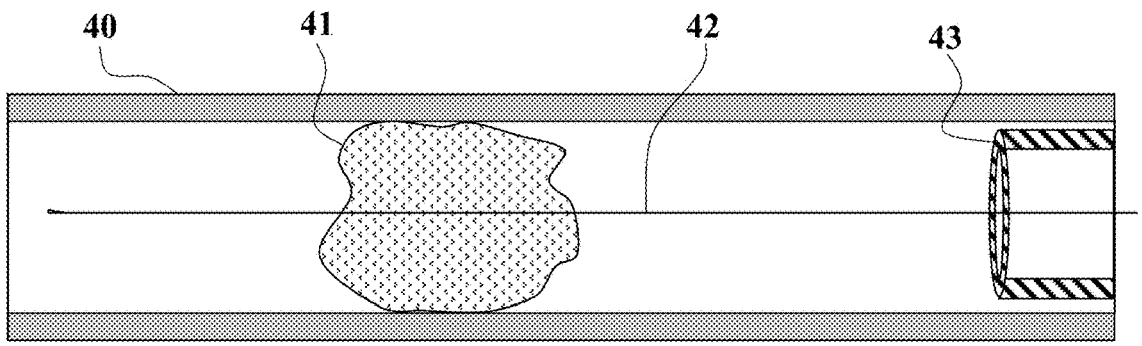
FIGS. 8A to 8H schematically illustrate emboli/clot removal process according to some possible embodiments.
Figure 8B:
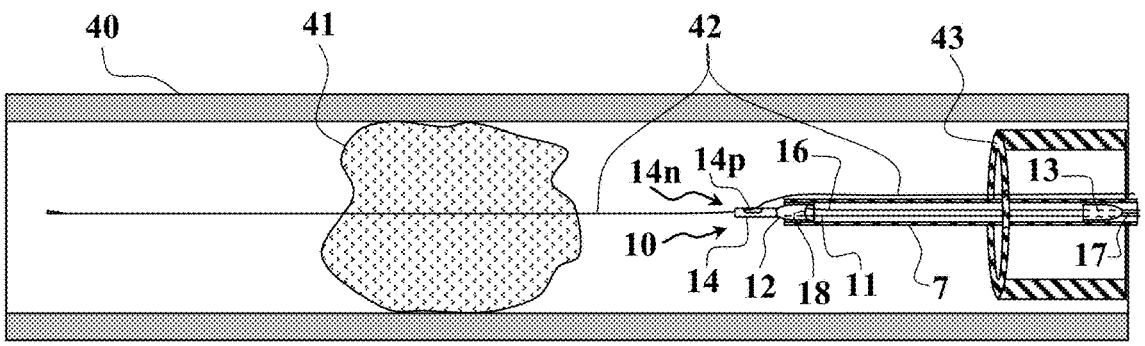
Figure 8C:
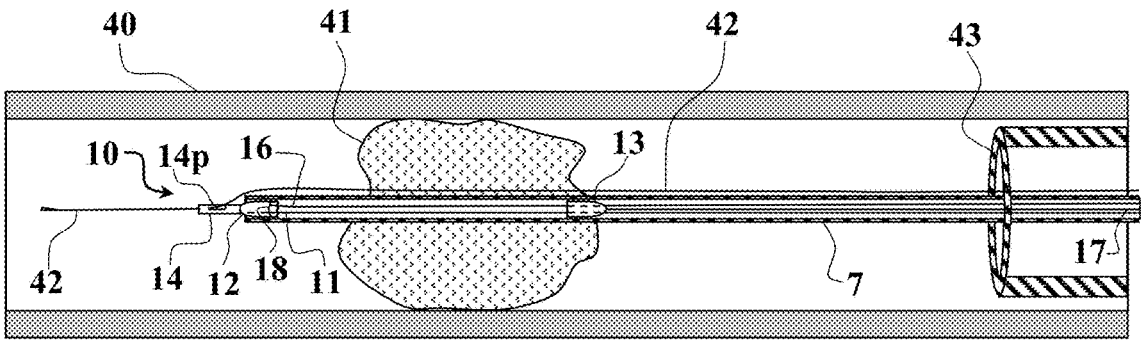
Figure 8D:
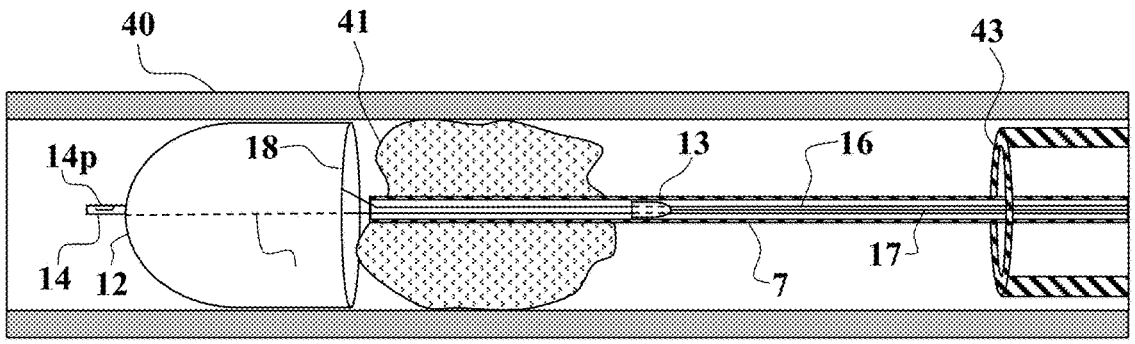
Figure 8E:
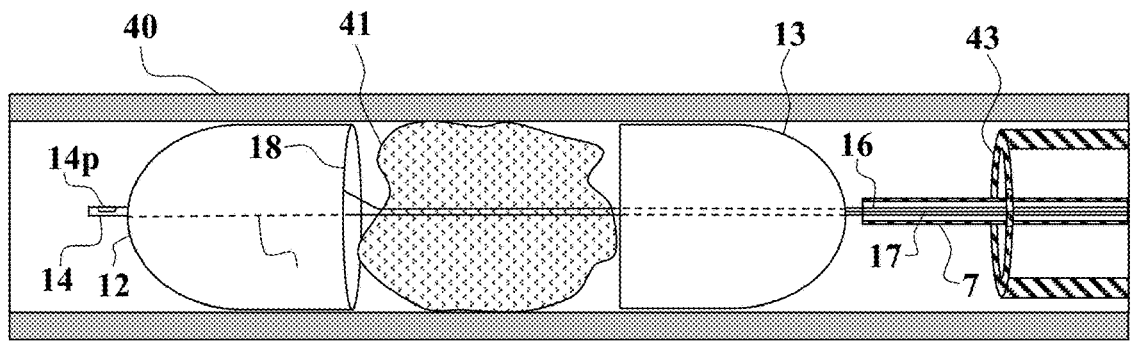
Figure 8F:
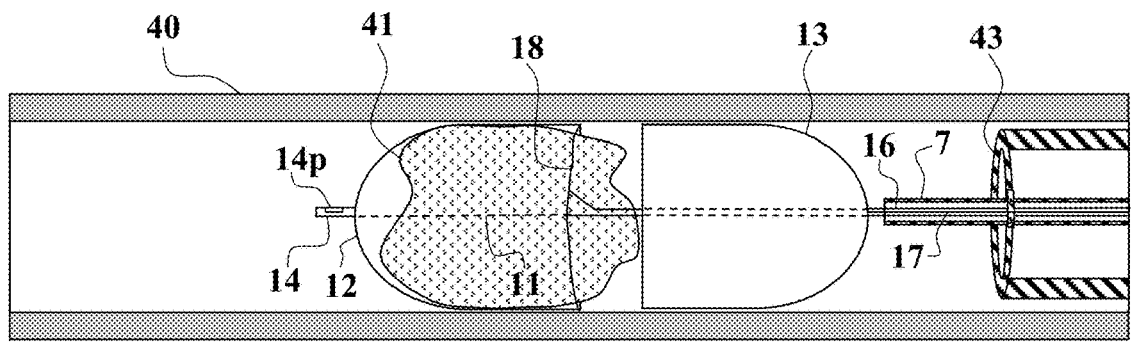
Figure 9:
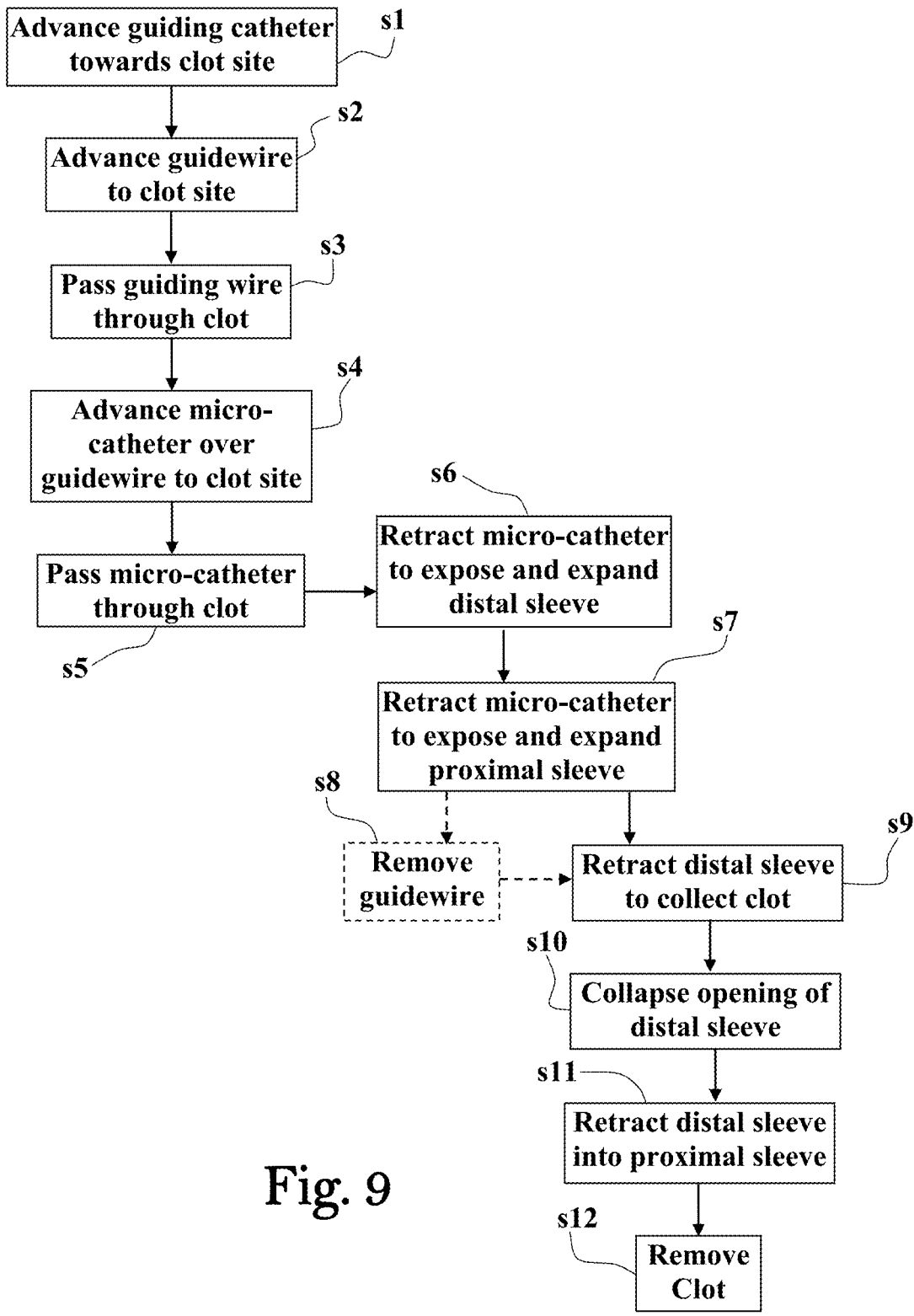
FIG. 9 is a flowchart schematically illustrating steps of the emboli/clot removal process schematically illustrated in FIGS. 8A to 8H.

Reference is made to FIGS. 8A to 8F and to the flowchart of FIG. 9, illustrating stages of a clot removal procedure according to possible embodiments. In FIG. 8A a guiding catheter 43 is advanced to a blood vessel 40 towards a treatment site (step s1) wherein clot/material 41 is located, to position the guiding catheter 43 in a certain vicinity to the clot/material 41 for delivery of the clot removal device to the treatment site. A guidewire 42 is advanced (step s2) through the guiding catheter 43 towards the clot/material 41 and penetrates/passed through the clot/material 41 (step s3).

In FIG. 8B, a delivery tube/micro-catheter 7 is via the guidewire 42 (step s4) through the guiding catheter 43 towards the treatment site, and passed out of the guiding-catheter 43 into the treatment site towards the clot/material 41. The delivery tube/micro-catheter 7 carries the clot removal device 10 in its undeployed state, namely, all the components of the clot removal device 10, which includes, inter alia, the proximal and distal sleeve elements 13 and 12, are compactly crimped folded therewithin such that its positioning tube 14 protrudes outwardly from a distal-end opening of the delivery tube/micro-catheter 7. As seen, the guidewire 42 is passed through the lateral aperture 14p and the distal opening 14n of the poisoning tube 14 protruding outwardly from the delivery tube/micro-catheter 7 for over-the-wire sliding the arrangement of the material removal device 10 and delivery tube/micro-catheter 7 towards the treatment site.

In FIGS. 8C to 8F, the delivery tube/micro-catheter 7 penetrates/passed through the clot/material 41 (step s5) over the guidewire 42. Once the delivery tube/micro-catheter 7 is in the desired position distal to the clot/material 41, the guidewire 42 can be retracted (step s8) out of treatment site back into the guiding catheter 43 and removed out of the body of the treated subject. The delivery tube/micro-catheter 7 is then retracted backwardly, i.e., in a proximal direction towards the guiding-catheter 43, and the distal sleeve element 12 is ejected/deployed (step s6) out of the delivery tube/micro-catheter 7 downstream of the clot/material 41 to assume its normally opened/deployed state, shown in FIG. 8C. The delivery tube/micro-catheter 7 is then further retracted backwardly towards the guiding-catheter 43, and the proximal sleeve element 13 is ejected/deployed (step s7) to assume its normally opened/deployed state in a location upstream to the clot 41, such that the clot/material 41 becomes located between the proximal sleeve element 13 and the distal sleeve element 12, as shown in FIG. 8E.

Figure 8G:
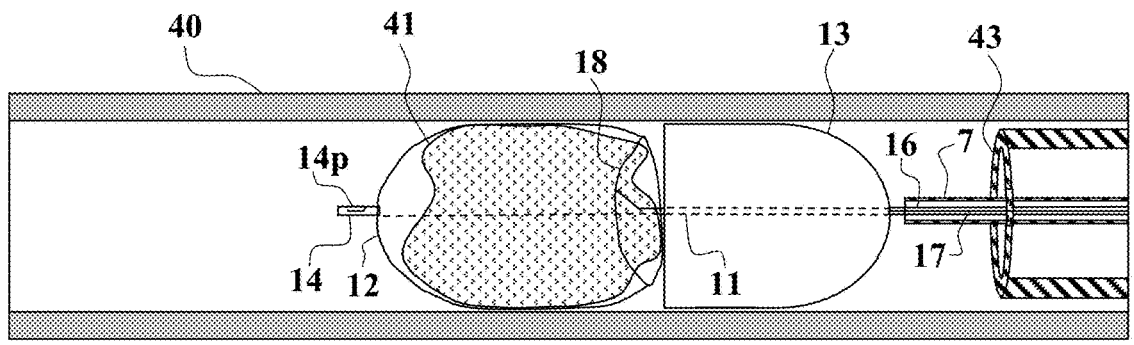

In FIG. 8F, the distal sleeve element 12 is moved/retracted backwardly towards the clot/material 41 by retracting/pulling its carrying wire 11. This way, the distal sleeve element 12 collects and entraps the clot/material 41 (step s9) therewithin and retains the clot/material 41 as the distal sleeve element 12 continues to retract backwardly towards the proximal sleeve element 13. Once the distal sleeve element 12 (with the clot/material 41 in it) is at a location relatively close to the proximal sleeve element 13, its retraction motion can be stopped. As seen in FIG. 8G, the control wire 16 can be then retracted backwardly for causing the manipulation ring element 18 to deform (stretch) and shift to its at least partially closed state, which consequently causes a portion of the distal sleeve element 12 (step s10) to change into an at least partially collapsed state thereof, so as to facilitate engagement of the distal sleeve element 12 with the proximal sleeve element 13.

Figure 8H:
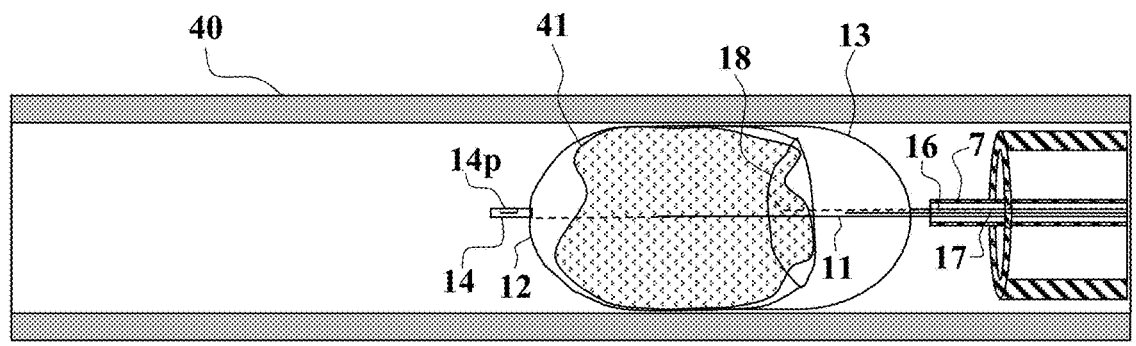

In FIG. 8H the distal sleeve element 12 is retracted backwardly into the proximal sleeve element 13 (step s11) such at least a portion of the distal sleeve element 12 is received within the proximal sleeve element 13 to form a capsule securing the clot/material 41 encapsulated therewithin. Then, the formed capsule and the clot/material 41 encapsulated therewithin can be retracted into the guiding catheter and removed (step s12) from the body of the treated subject.

FIGS. 10A to 10C schematically illustrate the control device 8 according to some possible embodiments comprising elongated top and bottom shell components 81c and 81b respectively, having elongated inner channels configured to form an elongated cavity for sliding motion of one or more control knobs 82, 83 and 84, therealong. With reference to FIG. 10C, the elongated top shell component comprises a distal elongated pass-through slit 81d and a proximal elongated pass-through slit 81p, and a central partition 81p separating therebetween. Respective open channels 81c are formed in distal end sections of the top and bottom shell components 81c and 81b, for receiving and moving therein a sliding tube 85 mechanically coupled to the hub 9h to which the delivery tube/micro-catheter 7 is mechanically coupled.

As seen in FIGS. 10A and 10B, the distal elongated pass-through slit 81d is configured for sliding motion of sliding control knob 82 mechanically coupled to the sliding tube 85 and configured to facilitate controlled motion of the delivery tube/micro-catheter 7 during the stage(s) of releasing of the elongated sleeve element(s) (12/13) inside the treatment site. The knob 82 is movably mounted over rod 82r extending upwardly from base element 82h dispose for sliding motion inside the elongated cavity of the control device 8. An elastic element (e.g., spring) 82s provided in a cavity formed in the base element 82h is configured to constantly push the control knob 82 upwardly for changing it between locked and sliding states thereof.

Referring back to FIG. 10C, the locked states of the control knob 82 are defined by the locking sockets g1 and g2, formed at the extremities of the distal elongated pass-through slit 81d, and its sliding state is defined between the locking sockets g1 and g2. The control knob 82 is initially located at the distal end of the distal elongated pass-through slit 81d, and the elastic element 82s pushing it upwardly causes a flaring bottom portion of the control knob 82 to be received in and gripped by the distal locking socket g1, thereby immobilizing the control knob 82 in its distal position. In order to release the material removal device from the delivery tube/micro-catheter 7, the delivery tube/micro-catheter 7 is retracted backwardly by the practitioner by pushing downwardly the control knob 82 to release the grip applied thereover by the distal locking socket g1, thereby enabling sliding motion of the sliding tube 85 and of the delivery tube/micro-catheter 7 mechanically coupled thereto. The practitioner can then move the control knob 82 proximally to release and deploy the clot removal device as the control knob 82 reaches the proximal end of the distal elongated pass-through slit 81*d* and become locked and immobilized again, this time by the locking socket g2.

As seen also in FIGS. 10A and 10B, the proximal elongated pass-through slit 81*p* is configured for sliding motion of sliding control knobs 83 and 84, which are respectively mechanically coupled to the carrying wire 11 of the distal sleeve element and the control wire 16 of the manipulation element 18. Proximal portions of the carrying and control wires, 11 and 16 respectively, can be held inside the control device 8 in respective retention tubes, 11*t* and 16*t*, configured to prevent entanglements of the wires thereinside. The control knob 83 is movably mounted over rod 83*r* extending upwardly from base element 83*h* dispose for sliding motion inside the elongated cavity of the control device 8. An elastic element (e.g., spring) 83*s* provided in a cavity formed in the base element 83*h* is configured to constantly push the control knob 83 upwardly for changing it between locked and sliding states thereof.

The control knob 84 is attached to a base element 84*h* by screw threads 84*t* passing therethrough and configured for locking the control knob 84 in any desired position along the proximal elongated pass-through slit 81*p*, by rotating the control knob 84 to cause its bottom end to pass the screw threads 84*t* all the way down and become pressed against the bottom floor of the bottom shell components 81*c*, thereby immobilizing the control knob 84.

Referring again to FIG. 10C, the locked states of the control knob 83 are defined by the locking socket g3 formed at the distal end of the proximal elongated pass-through slit 81*p* and the locking socket g4 formed at a midpoint of the distal elongated pass-through slit 81*p*, and its sliding state is defined between the locking sockets g3 and g4. The control knob 83 is initially located at the distal end of the of the proximal elongated pass-through slit 81*p*, and the elastic element 83*s* pushing it upwardly causes a flaring bottom portion of the control knob 83 to be received in and gripped by the distal locking socket g3, thereby immobilizing the control knob 83 in its distal position. The control knob 84 is initially placed adjacent to the control knob 83 for keeping the distal sleeve element (12) and its proximal opening (12*p*) in their normally opened/deployed states.

After the material removal device is released and deployed in the treatment site, the practitioner can move the distal sleeve element (12) backwardly to collect and capture the clot/material by pushing downwardly the control knob 83 to release the grip applied thereover by the distal locking socket g3, thereby enabling sliding motion of the base element 83*h* mechanically coupled to the carrying wire 11 of the distal sleeve element (12). The practitioner can then move the control knob 83 proximally to move the distal sleeve element (12) backwardly for capturing and holding thereinside the clot/material, as the control knob 83 reaches the midpoint of the proximal elongated pass-through slit 81*p* and become locked and immobilized again, this time by the locking socket g4. During this stage of the procedure the control knob 84 is moved proximally together with the control knob 83 to maintain the distal sleeve element (12) and its proximal opening (12*p*) in their normally opened/deployed states.

In this state the proximal sleeve element (13) can become engaged by the distal sleeve element (12), thereby encapsulating and securing the captured clot/material therebetween. In some embodiments the material removal device is removed from the body of the treated subject in this stage without further action/manipulation of the sleeve elements.

In some embodiments, after the control knob 83 becomes locked in the locking socket g4, the control knob 84 is moved towards the proximal end of the proximal elongated pass-through slit 81*p* to retract proximally the control wire (16), thereby deforming the manipulation element (18) and changing the distal sleeve element (12) and its proximal opening (12*p*) into their at least partially closed/collapsed states, for securing the captured clot/material inside the distal sleeve element (12). Optionally, the control knob 84 is changed into its locked state in this stage for instant removal of the material removal device from the body of the treated subject (e.g., in emergency situations). Alternatively, the control knob 83 can be release from the locking by the locking socket g4, and further moved proximally to insert at least some portion of the at least partially closed/collapsed distal sleeve element (12) and its proximal opening (12*p*) into the proximal sleeve element via its distal opening (13*p*).

Figure 11A:
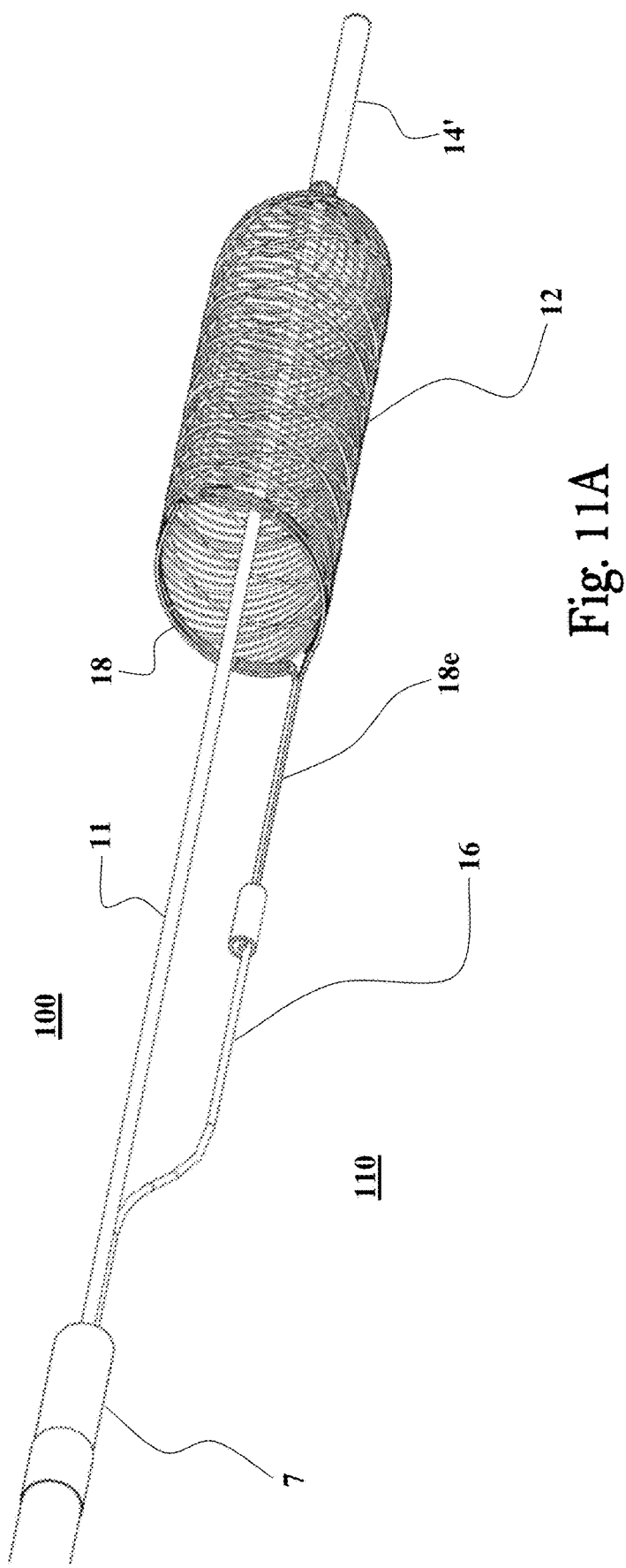

FIG. 11A schematically illustrates a material removal device 100 according to possible embodiments having a single braided elongated sleeve element 12. The material removal device 100 of FIG. 11A is different from the material removal device 10 of FIGS. 1 to 4 mainly in that it does not include the proximal sleeve element (13) and its carrying wire (17), and also in that its distal tip 14' is not configured for over-the-wire sliding/positioning. Therefore, the material removal device 100 is not suitable for placement in the treatment site over a guidewire. However, the material removal device 100 may be easily modified for over-the-wire placement by adjusting the tip 14' accordingly (e.g., by configuring tip 14' to include the lateral opening/window/aperture 14*p* as shown in FIGS. 1B, 2A, 2B, 2D, 8B-H).

FIGS. 11B and 11C schematically illustrate a material removal device 100' according to possible embodiments having a single braided elongated sleeve element 12 and a deformable tip 14" formed by support and/or mesh wires 12*t*,12*d* of the braided elongated sleeve element 12. As in previously disclosed embodiments, the wires of the braided elongated sleeve element 12 taper distally onto the carrying wire 11 (shown in FIG. 11C), and its proximal opening 12*p* is coupled to the manipulation ring element 18. The wires of the braided elongated sleeve element 12 can be attached to the carrying wire 11 by a crimp ring 14*r*, and/or welding, fusion, adhesives, or suchlike.

The tip 14" of the material removal device 100' can be formed by any suitable number of the support and/or mesh wires 12*t*,12*d* of the braided elongated sleeve element 12. In the specific and non-limiting example shown in FIGS. 11B and 11C, all of the support and/or mesh wires 12*t*,12*d* can extend distally at least a certain length after their attachment point (14*r*) to the carrying wire 11, but the tip 14" may be similarly designed to include only a portion of the support and/or mesh wires 12*t*,12*d*. The tip 14" can be this way designed to assume variable deformation properties along its length v1, v2, v3, . . . . Such tip configuration 14" substantially prevents perforation/injuries to blood vessel walls, and improves vascular maneuverability of the material removal device 100'.

For example, a first level of tip deformation is obtained in portion v1 of the tip 14" including all, or a substantial portion, of the support and/or mesh wires 12t,12d, a second/enhanced level of tip deformation is obtained in portion v2 of the tip 14" wherein the number of the wires 12t,12d is gradually decreased (e.g., 35% to 65%, optionally about 50%), towards a third/high level of tip deformation obtained in portion v3 of the tip 14" including fewer number (e.g., 5% to 35%, optionally about 15%) of the support and/or mesh wires 12t,12d, to thereby provide significantly enhanced level of elasticity to the extremity of the tip 14". For further improved deformability and/or maneuverability, an obtuse angle φ (e.g., about 150° to 170°, optionally about 160°) is provided in some embodiments in the tip 14" e.g., between the v2 and v3 tip portions.

Optionally, but in some embodiments preferably, the end portion v3 of the tip 14" is constructed solely from one or more, or all, of the support wires 12t. In this specific and non-limiting example the end portion v3 of the tip 14" includes only the extremities of the support wires 12t of the braided elongated sleeve element 12. In possible embodiments wherein the support wires 12t are made of/comprises radiopaque materials, this configuration guarantees full radiography visibility of the entire length of the tip 14" portion, without adding radiopaque markers to the braided elongated sleeve element 12.

The material removal device 100' can further comprise one or more markers 12m located on/in wires of the braided elongated sleeve element 12. In this specific and non-limiting example, two radiopaque markers (e.g., beads) 12m are placed on wire sections at opposite sides of the braided elongated sleeve element 12. This way, the markers 12m can be used to determine the diameter of the braided elongated sleeve element 12 after it is released from the delivery tube/micro-catheter (7), and guarantee that it is fully opened to inside the blood vessel 40. Such one or more markers 12m can be similarly used in all of the other embodiments material removal devices disclosed herein.

Figure 12A:
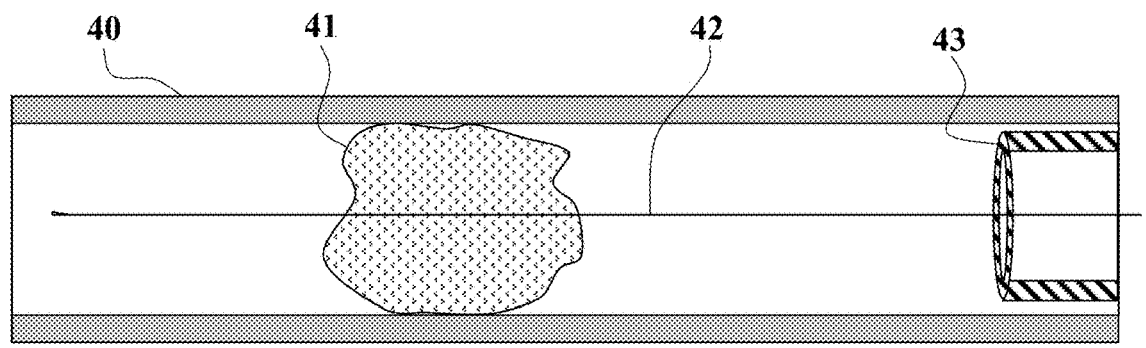
FIGS. 12A to 12E schematically illustrate a clot/emboli removal procedure according to some possible embodiments utilizing the clot/emboli removal device schematically illustrated in FIGS. 11A to 11C.
Figure 12B:
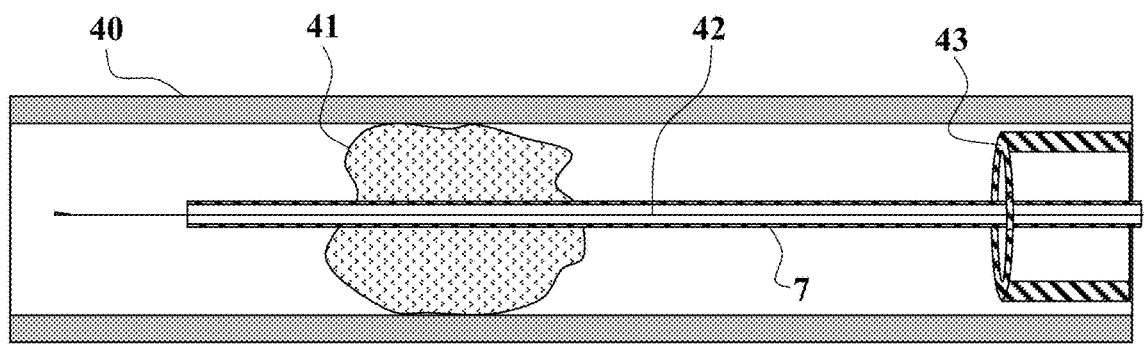
Figure 12C:
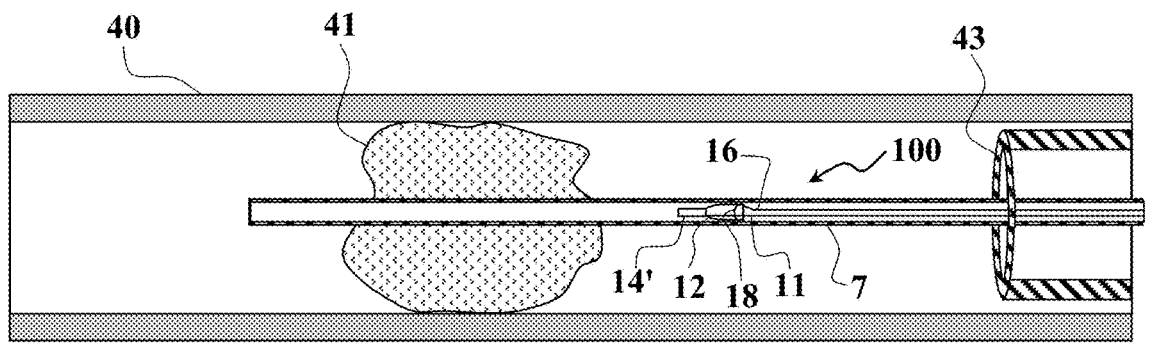
Figure 12D:
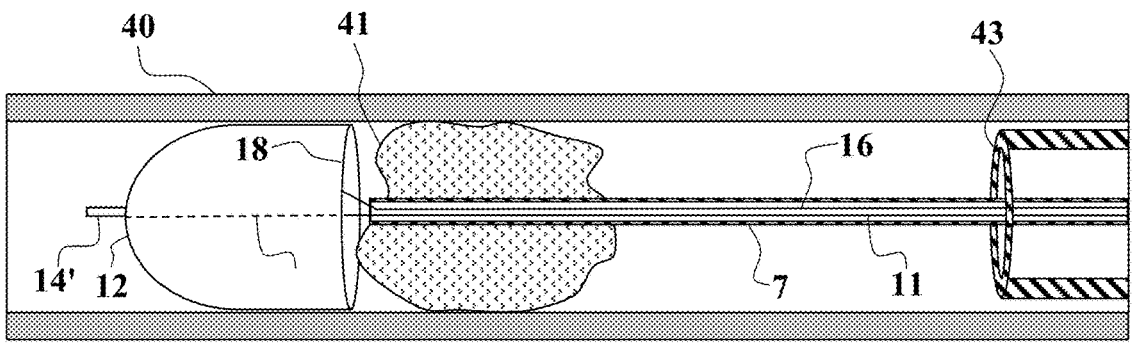
Figure 12E:
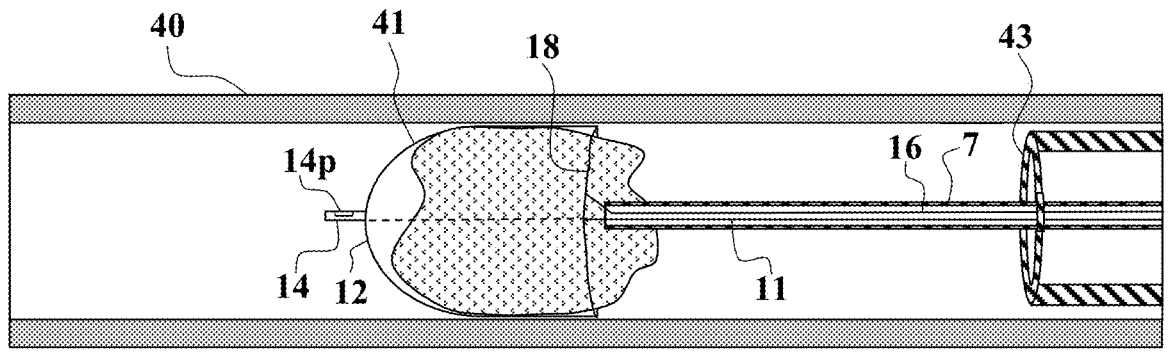
Figure 13:
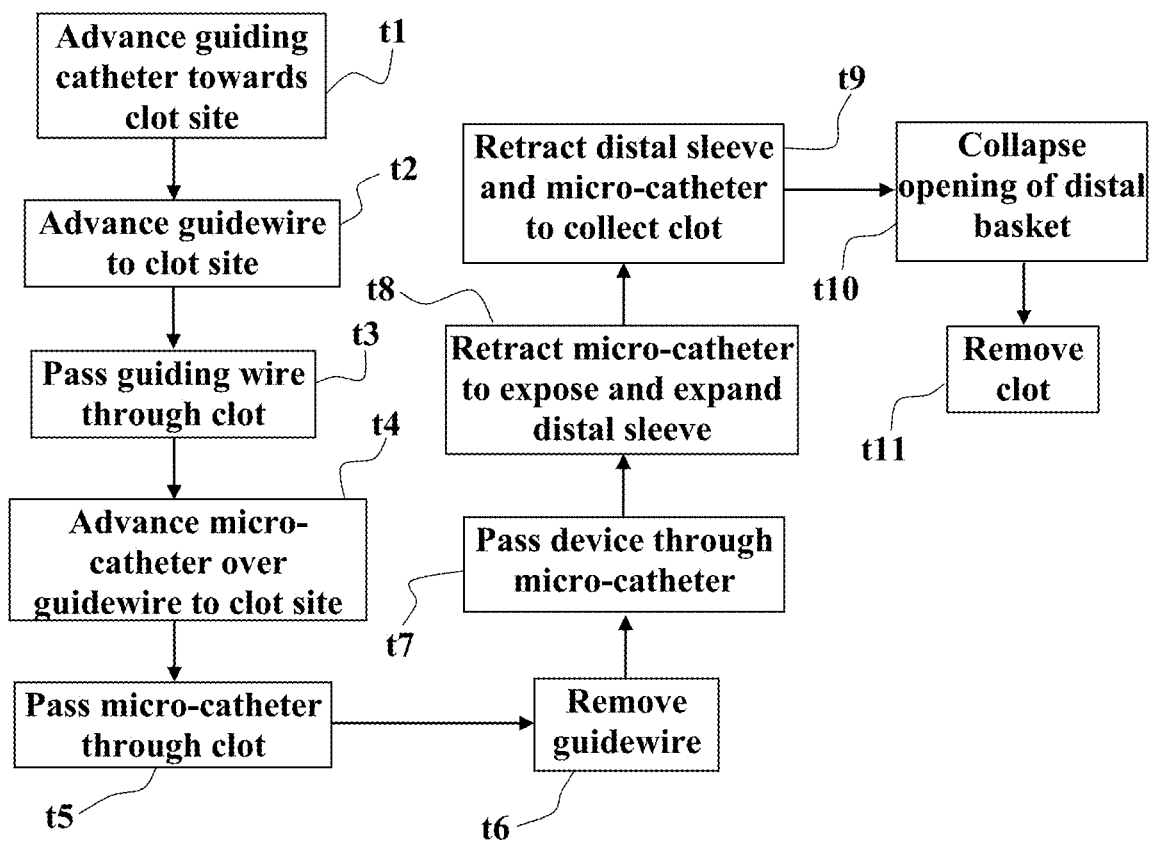
FIG. 13 is a flowchart schematically illustrating steps of the emboli/clot removal process schematically illustrated in FIGS. 12A to 12E.

Referring now to FIGS. 12A to 12E and the flowchart of FIG. 13, exemplifying a clot/material removal procedure carried out according to some possible embodiments utilizing the material removal device 100. The procedure can start in placement of the guiding catheter 43 at some vicinity to the treatment site (step t1), as seen in FIG. 12A. a guidewire 42 is then advanced (step t2) through the guiding catheter 43 and passed through the clot/material (step t3). Next, as seen in FIG. 12B, the delivery tube/micro-catheter 7 is advanced through the guiding catheter 43 and over the guidewire 42 to reach the treatment site (step t4), and passed through the clot/material 41 to position its distal end distal (e.g., downstream) to the clot/material 41 (step t5). The guidewire 42 is then retracted backwardly and removed (step t6) out through the guiding catheter (43).

The material removal device 100 is then advanced through the delivery tube/micro-catheter 7 (step t7) towards the treatment site, as shown in FIG. 12C, by pushing its carrying wire 11 distally. The material removal device 100 is advanced through the delivery tube/micro-catheter 7 until it passes the clot/material 41 and reaches the distal end opening of the delivery tube/micro-catheter 7. In this stage the delivery tube/micro-catheter 7 is retracted proximally (step t8) to release and deploy the distal sleeve element 12 distal to the clot/material 41, as shown in FIG. 12D. Thereafter, the carrying wire 11 is retracted proximally (step t9) to move the distal sleeve element 12 proximally and entrap the clot/material thereinside, as seen in FIG. 12E. The control wire 16 can be then retracted proximally (step t10) to deform/stretch the manipulation ring element (18) and cause the opening (12p) and at least some portion of the distal sleeve element 12 to change into their at least partial closed/collapsed states and secure the captured clot/material thereinside. The clos/material removal device 100 and the delivery tube/micro-catheter 7 are then removed through the guiding catheter 43 out of the body of the treated subject (step t11).

Figure 14:
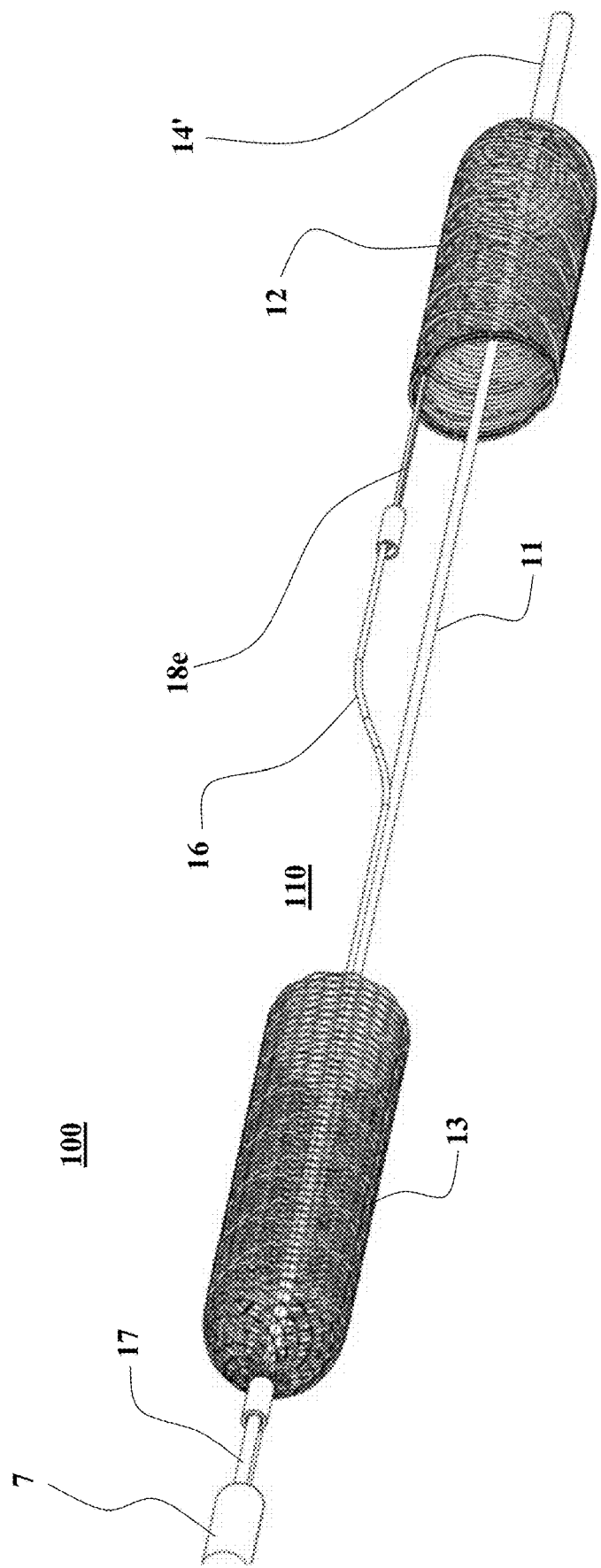
FIG. 14 schematically illustrates a clot/emboli removal device according to yet other possible embodiments.

FIG. 14 schematically illustrates a material removal device 110 according to possible embodiments having distal and proximal braided elongated sleeve elements 12 and 13. The material removal device 110 of FIG. 14 is different from the material removal device 10 of FIGS. 1 to 4 mainly in that its distal tip 14' is not configured for over-the-wire sliding/positioning. Therefore, the material removal device 110 is not suitable for placement in the treatment site over a guidewire.

Figure 15A:
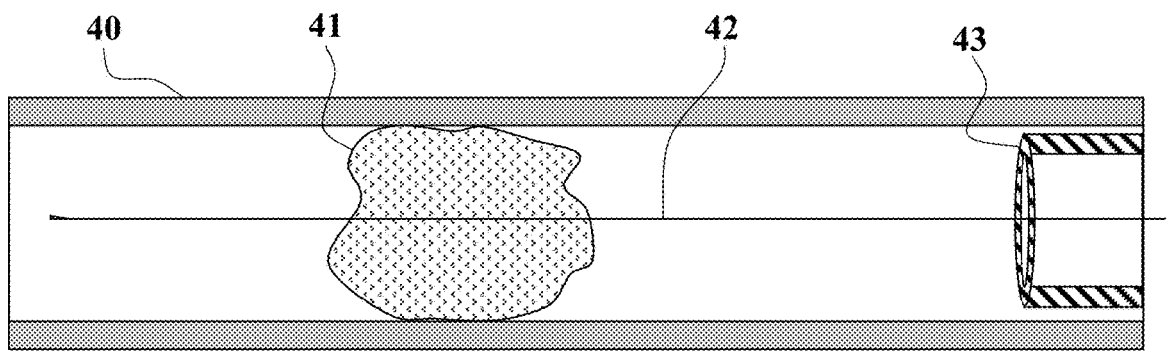
FIGS. 15A to 15D schematically illustrate a clot/emboli removal procedure according to some possible embodiments utilizing the clot/emboli removal device schematically illustrated in FIG. 14.
Figure 15B:
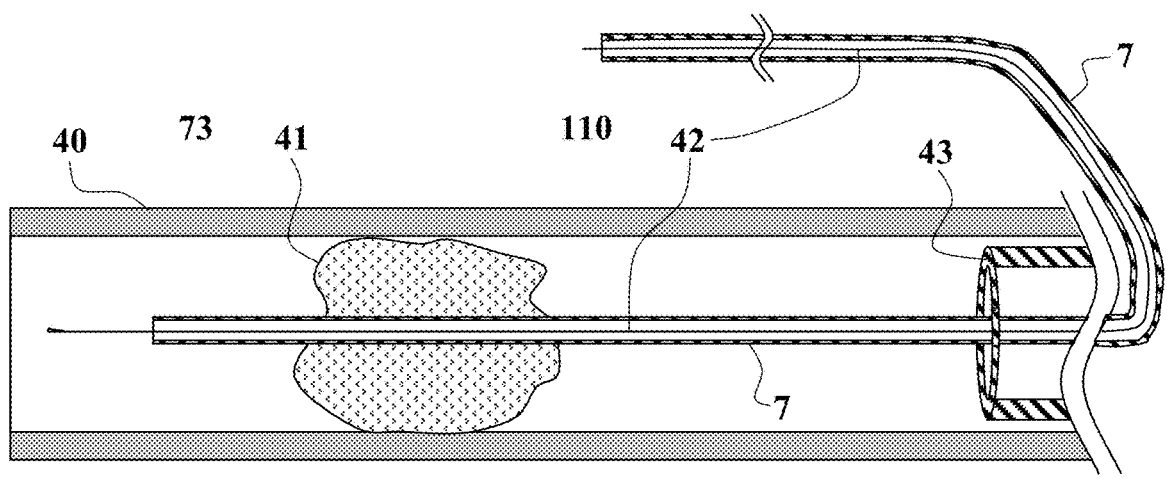
Figure 15C:
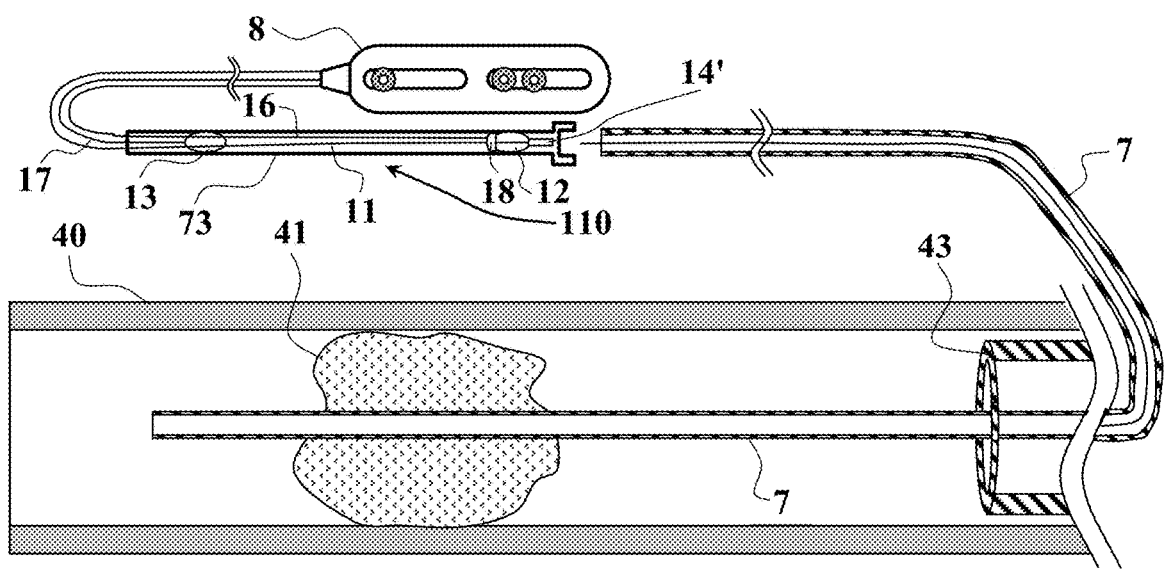
Figure 15D:
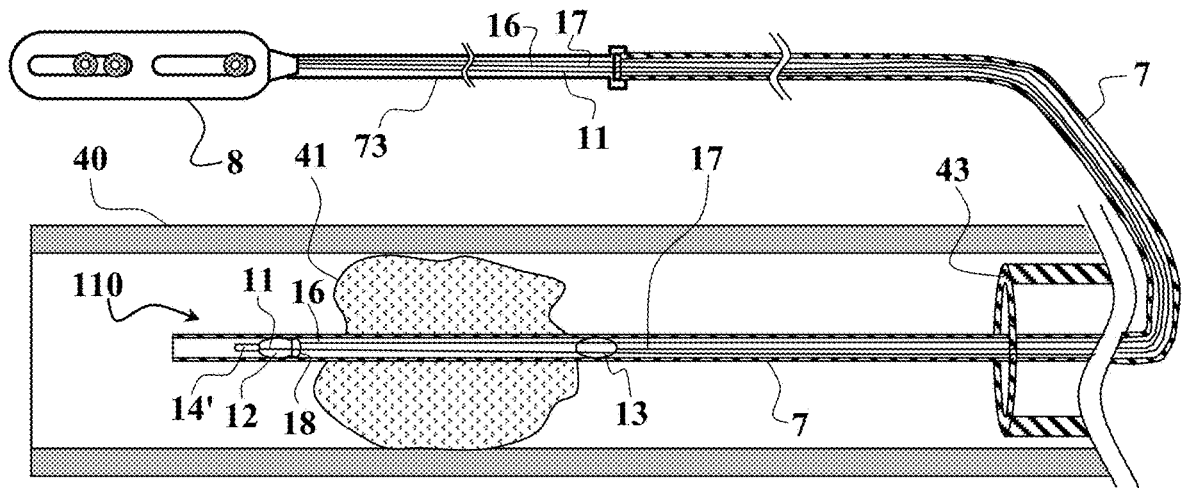
Figure 16:
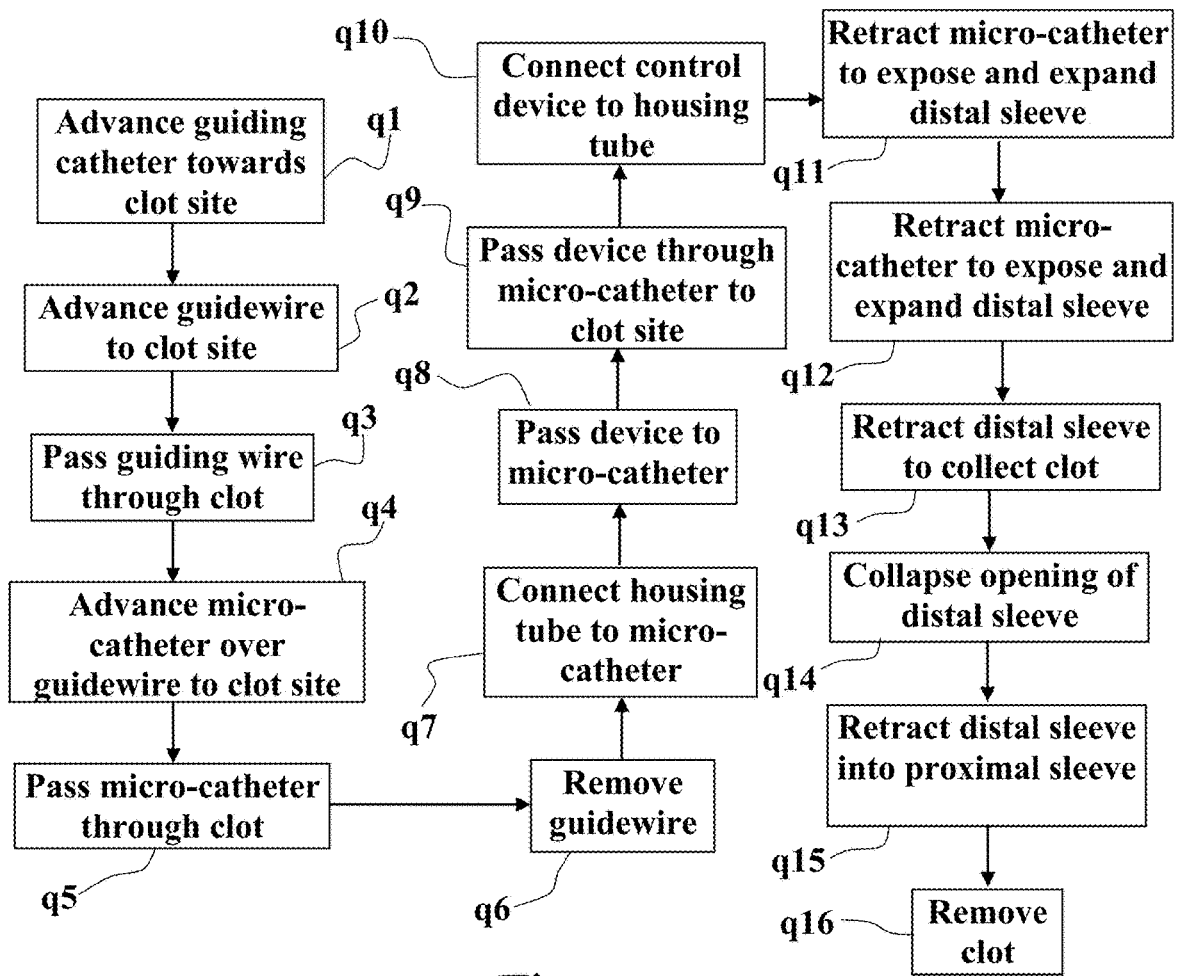
FIG. 16 is a flowchart schematically illustrating steps of the emboli/clot removal process schematically illustrated in FIGS. 15A to 15D.

Referring now to FIGS. 15A to 15D and the flowchart of FIG. 16, exemplifying a clot/material removal procedure carried out according to some possible embodiments utilizing the material removal device 110. The procedure can start in placement of the guiding catheter 43 at some vicinity to the treatment site (step q1), as seen in FIG. 15A. A guidewire 42 is then advanced (step q2) through the guiding catheter 43 and passed through the clot/material (step q3). Next, as seen in FIG. 15B, the delivery tube/micro-catheter 7 is advanced through the guiding catheter 43 and over the guidewire 42 to reach the treatment site (step q4), and passed through the clot/material 41 to position its distal end distal (e.g., downstream) to the clot/material 41 (step q5). The guidewire 42 is then retracted backwardly and removed (step q6) out through the guiding catheter (43).

FIG. 15C shows a procedure stage after the delivery tube/micro-catheter 7 is advanced through the guiding catheter 43 and passed through the clot/material 41, and the guidewire 42 is removed out. As shown, in some embodiments the material removal device 110 is provided compactly crimped and readily operable for use inside a housing tube 73 configured for quick connection to the delivery tube/micro-catheter 7 at one side thereof, and for quick connection to the control device 8 at its other side. After the guidewire 42 in removed (step q6) out of the delivery tube/micro-catheter 7, the housing tube 73 is attached to the proximal end of the delivery tube/micro-catheter 7 (step q7), and the distal and proximal sleeve elements, 12 and 13, are then advanced distally into the delivery tube/micro-catheter 7 (step q8), and then further advanced through the delivery tube/micro-catheter 7 towards the treatment sire (step q9).

In possible embodiments, the carrying wires 11 and 17, and the control wire 16, are provided readily connected for operation connected to the control knobs of the control device. The control device 8 can be then connected to the housing tube 73 (step q10) for carrying out the clot/material removal steps. Accordingly, in some embodiments the lengths of the carrying (11/17) and control (16) wires is accurately determined such that the practitioner carrying out the procedure is not required to carry out any adjustments in their lengths to permit quick connection of the control device 8 to the housing tube 73 and the carrying (11) and control (16) wires of the material removal device 110. This way, the housing tube 73 and the material removal device 110 held inside can be readily provided for clot/material removal procedures.

Next, the material removal device 110 is further advanced to pass the clot/material 41 and locate the distal sleeve element 12 distal to the clot/material 41, as shown in FIG. 15D. In the next steps the delivery tube/micro-catheter 7 is retracted backwardly to release and deploy the distal sleeve element distal to the clot/material 41 (step q11), the delivery tube/micro-catheter 7 is further retracted backwardly to release and deploy the proximal sleeve element proximal to the clot/material 41 (step q12), the distal sleeve element 12 is retracted proximally to capture the clot/material thereinside (step q12), the control wire 16 is then retracted proximally to deform/stretch the manipulation element 18 and cause the proximal opening of the distal sleeve element 12 and at least some portion of the distal sleeve element 12 to change into their at least partially closed/collapsed states (step q14) and secure the captured clot/material thereinside. In this stage, according to some embodiments, the material removal device 110 is removed trough the guiding catheter 43 out of the body of the treated subject with the captured clot/material 41 secured thereinside.

Alternatively, in possible embodiments, after the control wire 16 is retracted proximally to deform the manipulation element 18 to secure the captured clot/material inside distal sleeve element 12 (step q14), the procedure proceeds by proximally retracting the distal sleeve element 12 in its at least partially closed/collapsed state into the proximal sleeve element 13 (step q15), to encapsulate the trapped and secured clot/material 41 in the capsule structure thereby formed. Finally, the material removal device 110 is removed trough the guiding catheter 43 out of the body of the treated subject with the captured (q16), secured and encapsulated, clot/material 41.

The procedure steps q11 to q16 are substantially similar to the procedure steps shown in FIGS. 8D to 8H, and thus not illustrated again for the sake of brevity.

Figure 17A:
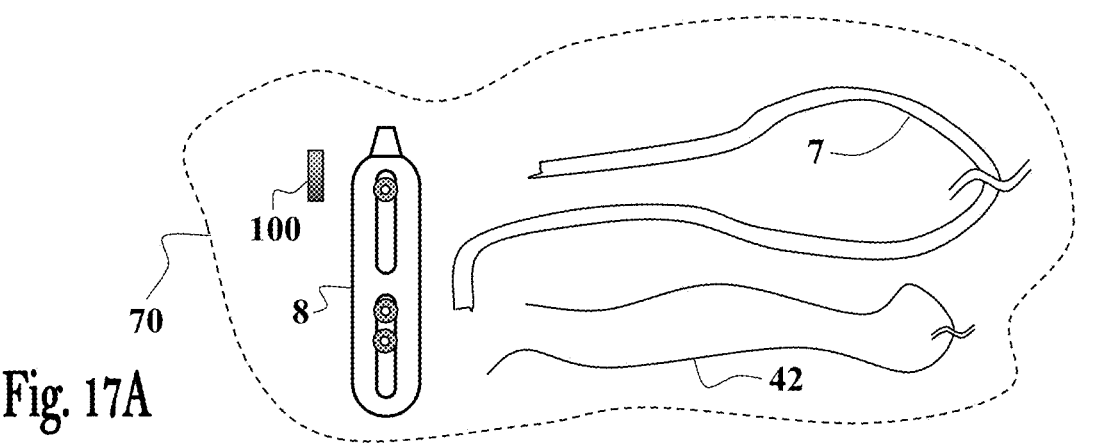
FIGS. 17A to 17C schematically illustrating clot/material removal kits according to some possible embodiments.
Figure 17B:
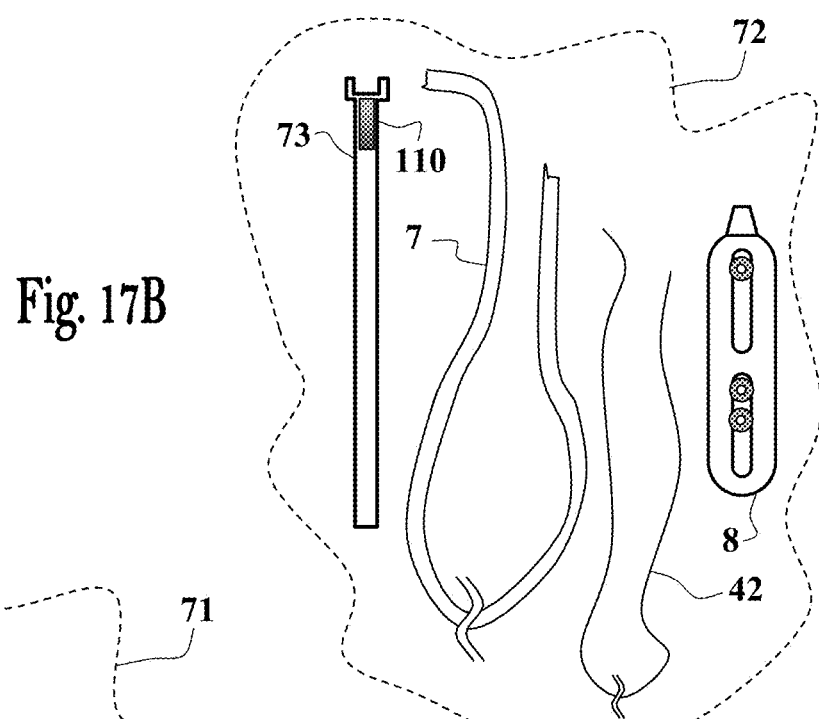
Figure 17C:
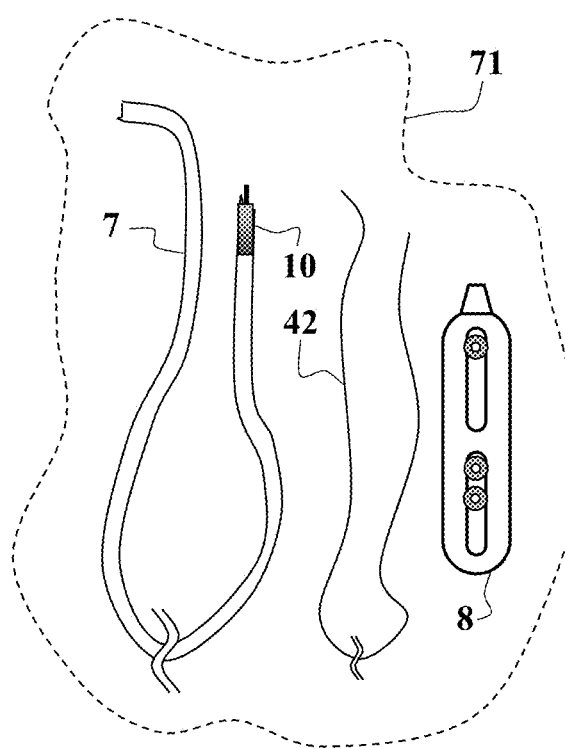

FIG. 17A shows a material removal kit 70 comprising the material removal device 100 shown in FIG. 11A (or 100' shown in FIGS. 11B and 11C), a guidewire 42, a delivery tube/micro-catheter 7, and a control device 8 configured to facilitate clot/material removal procedures utilizing the material removal device 100, as disclosed hereinabove. FIG. 17B shows a material removal kit 72 comprising the housing tube 73 having the material removal device 110 shown in FIG. 14 compactly crimped thereinside, a guidewire 42, a delivery tube/micro-catheter 7, and a control device 8 configured to facilitate clot/material removal procedures utilizing the material removal device 110, as disclosed hereinabove. FIG. 17C shows a material removal kit 71 comprising, a guidewire 42, a delivery tube/micro-catheter 7 having the material removal device 10 shown in FIGS. 1 to 4 compactly crimped thereinside, and a control device 8 configured to facilitate clot/material removal procedures utilizing the material removal device 10, as disclosed hereinabove.

It should be understood that throughout this disclosure, where a process or method is shown or described, the steps of the method may be performed in any order or simultaneously, unless it is clear from the context that one step depends on another being performed first. It is also noted that terms such as main, secondary first, second, . . . etc. may be used to refer to specific elements disclosed herein without limiting, but rather to distinguish between the disclosed elements. Relative terms such as "lower," "upper," "horizontal," "vertical," "above," "below," "up," "down," "top" and "bottom", as well as derivatives thereof (e.g., "horizontally," "downwardly," "upwardly," etc.), and similar adjectives in relation to orientation of the described elements/components refer to the manner in which the illustrations are positioned on the paper, not as any limitation on the orientations in which these elements/components can be used in actual applications.

As described hereinabove and shown in the associated figures, the present disclosure provides material removal devices/systems, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A clot removal device comprising:
a main carrying wire;
a main elongated sleeve element braided from a plurality of wires to form a proximal tubular section having a proximal opening and a funnel-shaped distal section tapering distally onto a distal end portion of said main carrying wire for rigid attachment thereto, said main braided elongated sleeve element is configured for deployment inside a blood vessel downstream to a target clot and for capturing said target clot through said proximal opening by proximal retraction thereof via said main carrying wire;
a deformable ring element coupled to the proximal opening of said main braided elongated sleeve element and configured for changing said proximal opening from a normally opened state to an at least partially closed state after the capturing of said target clot inside said main braided elongated sleeve element, said deformable ring element comprises two elastically coupled half-ring segments defining a deformation axis of said deformable ring element and having a plurality of attachment sites for attachment of said plurality of wires to said deformable ring element;
a control wire rigidly coupled to said deformable ring element for manipulating the proximal opening of said main braided elongated sleeve element between a normally opened and an at least partially closed state with respect to said deformation axis for secure removal of the captured target clot from said blood vessel; and
a deformable tip distally extending from the funnel-shaped distal section of said main braided elongated sleeve element, wherein said deformable tip is formed by at least a portion of the plurality of wires of said main braided elongated sleeve element, and wherein the deformable tip is configured to provide variably changing deformation levels along its length by changing a number of the plurality of wires of said main elongated sleeve element thereinside.

2. The clot removal device according to claim 1 wherein the plurality of attachment sites comprises one or more eyelets.

3. The clot removal device according to claim 1 wherein the deformable ring element comprises a plurality of elastically collapsible elements configured to facilitate deformation of the shape of said deformable ring element by the control wire.

4. The clot removal device according to claim 1 wherein the deformable ring element comprises a "V"-shaped portion having two deformable arms elastically connected one to the other at a distal apex of said "V"-shaped portion and extending proximally and in sideway directions with respect to the deformation axis, said two deformable arms elastically connecting between drag-ends of the two half-ring segments.

5. A clot removal system comprising:
a guidewire configured to be introduced into a blood vessel and pass through a target clot;
a delivery tube configured for passage over said guidewire into said blood vessel to a vicinity of the target clot; and
the clot removal device according to claim 1 configured for passage through said delivery tube into the blood vessel to capture and remove said target clot inside the main braided elongated sleeve element.

6. A clot removal system comprising:
a guidewire configured to be introduced into a blood vessel and pass through a target clot;
a delivery tube configured for passage over said guidewire into said blood vessel and passage through the target clot;
a housing tube configured to connect to said delivery tube; and
the clot removal device according to claim 1 comprised inside said housing tube readily operable for deployment inside said blood vessel and configured for passage into and through the delivery tube and therefrom into the blood vessel to capture and remove said target clot inside the main braided elongated sleeve element.

7. The clot removal device according to claim 1 wherein the deformable ring element has a double-ring structure defining one or more passages therein configured for loose attachment of the plurality of wires of the main elongated sleeve element to permit sliding motion thereof thereover.

8. The clot removal device according to claim 7 wherein the deformable ring element comprises a plurality of double-ring segments defining a respective plurality of spaced-apart arch-shaped passages configured for loose attachment of the plurality of wires of the main elongated sleeve element to permit sliding motion thereof.

9. The clot removal device according to claim 1 comprising:
a secondary carrying wire; and
a secondary elongated sleeve element braided from a plurality of wires to form a distal tubular section having a distal opening and a funnel-shaped proximal section tapering proximally onto a distal end portion of said secondary carrying wire for rigid attachment thereto, said secondary braided elongated sleeve element is configured for deployment inside said blood vessel upstream to the target clot and for encapsulating the target clot between the main braided elongated sleeve element and said secondary braided elongated sleeve element.

10. The clot removal device according to claim 9 wherein the plurality of wires of the secondary elongated sleeve element comprises a plurality of support wires configured to geometrically define the proximal tubular and funnel-shaped distal sections of the secondary braided elongated sleeve element, and a plurality of mesh wires interwoven with said plurality of support wires, wherein a cross-section of said mesh wires is smaller than a cross-section of said support wires.

11. The clot removal device according to claim 10 wherein the plurality of support wires respectively spirally and helically extend in one rotational direction in the funnel-shaped distal section and in the proximal tubular section of the secondary braided elongated sleeve element, and wherein the plurality of mesh wires are respectively spirally and helically interwoven with said plurality of support wires in a counter rotational direction.

12. The clot removal device according to claim 10 comprising a first group of the plurality of support wires spirally and helically extending in the one rotational direction in the funnel-shaped distal section and in the proximal tubular section of the secondary braided elongated sleeve element, a second group of the plurality of support wires spirally and helically extending in the counter rotational direction in said funnel-shaped distal section and in said proximal tubular section, wherein the plurality of mesh wires are respectively spirally and helically interwoven in the counter rotational direction with support wires of said first and second groups.

13. The clot removal device according to claim 1 comprising an elastically deflectable tube forming a distal tip of the device and comprising a distal tube opening and a side opening configured for passage of a guidewire therethrough for sliding motion thereover.

14. The clot removal device according to claim 13 wherein the elastically deflectable tube comprises a plurality of arch-shaped pass-through slits spaced-apart along its length for enhancing its elasticity.

15. The clot removal device according to claim 14 comprising a first group of the arch-shaped slits formed in a wall section of the elastically deflectable tube located opposite to the side opening, and a second group of the arch-shaped slits interlacingly formed in a distal portion of the elastically deflectable tube.

16. A clot removal system comprising:
a guidewire configured to be introduced into a blood vessel and pass through a target clot;
a delivery tube; and
the clot removal device according to claim 13 comprised inside said delivery tube readily operable for deployment inside said blood vessel such that the elastically deflectable tube of said clot removal device outwardly protrudes through an opening of said delivery tube for sliding the same over said guidewire for passage through said target clot to capture and remove said target clot inside the main braided elongated sleeve element.

17. The clot removal system of claim 16 comprising a control device having one or more control knobs configured to facilitate deployment of the clot removal device inside the blood vessel and capturing of the target clot inside its braided elongated sleeve element.

18. The clot removal system of claim 17 wherein the control device configured to define locked and sliding states of the one or more control knobs in accordance with predefined steps of a clot removal procedure.

19. The clot removal system of claim 18 wherein one of the one or more control knobs is coupled to the control wire configured to facilitate manipulation of the deformable ring element for securing the captured clot inside the main elongated sleeve element.

20. The clot removal system of claim 18 wherein one of the one or more control knobs is coupled to the delivery tube, and wherein the locked and sliding states of said control knob corresponds to stages of deployment of at least the elongated sleeve elements.

21. The clot removal system of claim 20 wherein one of the one or more control knobs is coupled to the main carrying wire, and wherein the locked and sliding states of said control knob corresponds to stages of capturing and securing the target clot inside the main elongated sleeve element.

22. A clot removal device comprising:
a main carrying wire;
a main elongated sleeve element braided from a plurality of wires to form a proximal tubular section having a proximal opening and a funnel-shaped distal section tapering distally onto a distal end portion of said main carrying wire, said main braided elongated sleeve element is configured for deployment inside a blood vessel downstream to a target clot and for capturing said target clot through said proximal opening by proximal retraction thereof via said main carrying wire;

a deformable ring element coupled to the proximal opening of said main braided elongated sleeve element and configured for changing said proximal opening from a normally opened state to an at least partially closed state after the capturing of said target clot inside said main braided elongated sleeve element, said deformable ring element comprises two elastically coupled half-ring segments defining a deformation axis of said deformable ring element and having a plurality of attachment sites for attachment of said plurality of wires to said deformable ring element;

a control wire rigidly coupled to said deformable ring element for manipulating the proximal opening of said main braided elongated sleeve element between the normally opened and the at least partially closed states with respect to said deformation axis for secure removal of the captured target clot from said blood vessel; and wherein the deformable ring element comprises a "Y"-shaped portion having an elongated leg configured for coupling to the control wire, and two deformable arms extending distally from a distal end of said elongated leg and in sideway directions with respect to a longitudinal axis of said elongated leg, each one of said two deformable arms elastically connects between said distal end of said elongated leg and a traction-end of a respective one of the two half-ring segments.

23. A clot removal device comprising:
a main carrying wire;
a main elongated sleeve element braided from a plurality of wires to form a proximal tubular section having a proximal opening and a funnel-shaped distal section tapering distally onto a distal end portion of said main carrying wire, said main braided elongated sleeve element is configured for deployment inside a blood vessel downstream to a target clot and for capturing said target clot through said proximal opening by proximal retraction thereof via said main carrying wire;

a deformable ring element coupled to the proximal opening of said main braided elongated sleeve element and configured for changing said proximal opening from a normally opened state to an at least partially closed state after the capturing of said target clot inside said main braided elongated sleeve element, said deformable ring element comprises two elastically coupled half-ring segments defining a deformation axis of said deformable ring element and having a plurality of attachment sites for attachment of said plurality of wires to said deformable ring element;

a control wire rigidly coupled to said deformable ring element for manipulating the proximal opening of said main braided elongated sleeve element between the normally opened and the at least partially closed states with respect to said deformation axis for secure removal of the captured target clot from said blood vessel;

wherein the plurality of wires of the main braided elongated sleeve element comprises a plurality of support wires, configured to geometrically define the proximal tubular portion and the funnel-shaped distal section of the main braided elongated sleeve element, and a plurality of mesh wires interwoven with said plurality of support wires, wherein a cross-section of said mesh wires is smaller than a cross-section of said plurality of support wires, and wherein said plurality of wires of the main braided elongated sleeve element has one of the following configurations: (i) the plurality of support wires respectively spirally and helically extend in one rotational direction in the funnel-shaped distal section and in the proximal tubular section of the main braided elongated sleeve element, and wherein the plurality of mesh wires are respectively spirally and helically interwoven with said plurality of support wires in a counter rotational direction; or (ii) a first group of the plurality of support wires spirally and helically extending in the one rotational direction in the funnel-shaped distal section and in the proximal tubular section of the braided elongated sleeve element, and a second group of the plurality of support wires spirally and helically extending in the counter rotational direction in said funnel-shaped distal section and in said proximal tubular section, the plurality of mesh wires are respectively spirally and helically interwoven in the counter rotational direction with support wires of said first and second groups.

24. A method for removing a clot from a blood vessel, the method comprising:
delivering a crimped braided sleeve element into a blood vessel and deploying the same downstream to a target clot, said braided sleeve element is braided from a plurality of wires to form a proximal tubular section having a normally open proximal opening coupled to a deformable ring element coupled to a control wire, a funnel-shaped distal section tapering distally onto a distal end portion of a carrying wire for rigid attachment thereto, and a deformable tip formed by at least a portion of the plurality of wires distally extending from the funnel-shaped distal section and configured to provide variably changing deformation levels along its length by changing a number of the plurality of wires therein, said deformable ring element comprises two elastically coupled half-ring segments defining a deformation axis of said deformable ring element and having a plurality of attachment sites for attachment of said plurality of wires to said deformable ring element, and configured for changing said proximal opening from a normally opened state to an at least partially closed state after capturing said target clot inside said braided sleeve element;

proximally retracting said braided sleeve element to capture said target clot thereinside via its normally open proximal opening;

using said control wire to deform said deformable ring element and thereby change said normally open proximal opening into the at least partially closed state, thereby securing the captured target clot thereinside; and retrieving said braided elongated sleeve element.

25. The method according to claim 24 comprising delivering the crimped braided sleeve element into the blood vessel inside a delivery tube, wherein the delivering comprises:
introducing a guidewire into the blood vessel;
passing said guidewire through the target clot;
sliding a distal tip tube structure of the braided elongated sleeve element over said guidewire to position said delivery tube inside the blood vessel, said distal tip tube structure protruding outwardly from an opening of said delivery tube; and retracting said delivery tube proximally, thereby deploying the braided elongated sleeve element inside the blood vessel.

26. The method of claim 24 comprising:

introducing a guidewire into the blood vessel and passing said guidewire through the target clot;

passing a delivery tube over said guidewire into said blood vessel and passing the same through said target clot;

removing said guidewire from said delivery tube;

passing the braided elongated sleeve element into said blood vessel through said delivery tube; and retracting said delivery tube proximally to deploy said braided elongated sleeve element inside said blood vessel for capturing and retrieving said target clot thereinside.

27. The method of claim 26 comprising: connecting a housing tube to the delivery tube, said housing tube comprising the braided elongated sleeve readily operable for deployment; and passing said braided elongated sleeve element from said housing tube into said delivery tube for passage therethrough into the blood vessel.

* * * * *